United States Patent
Lee

(10) Patent No.: US 8,472,947 B2
(45) Date of Patent: Jun. 25, 2013

(54) CALL PROCESSING SYSTEM FOR MOBILE AND METHOD THEREOF

(75) Inventor: Seung Youl Lee, Guri (KR)

(73) Assignee: KT Corporation, Gyeonggi-do (KR)

(*) Notice: Subject to any disclaimer, the term of this patent is extended or adjusted under 35 U.S.C. 154(b) by 323 days.

(21) Appl. No.: 12/747,877

(22) PCT Filed: Dec. 12, 2008

(86) PCT No.: PCT/KR2008/007374
§ 371 (c)(1),
(2), (4) Date: Aug. 30, 2010

(87) PCT Pub. No.: WO2009/078626
PCT Pub. Date: Jun. 25, 2009

(65) Prior Publication Data
US 2010/0330987 A1 Dec. 30, 2010

(30) Foreign Application Priority Data

Dec. 14, 2007 (KR) .................. 10-2007-0131518
Dec. 14, 2007 (KR) .................. 10-2007-0131519

(51) Int. Cl.
*H04W 4/00* (2009.01)
(52) U.S. Cl.
USPC .............. 455/432.1; 455/432.2; 455/433; 455/436; 455/437; 455/438; 455/439; 455/440; 455/441; 455/442
(58) Field of Classification Search
USPC .............. 455/436–444, 432.1, 432, 433
See application file for complete search history.

(56) References Cited

U.S. PATENT DOCUMENTS

| 6,138,006 A * | 10/2000 | Foti ............... 455/414.1 |
| 6,871,069 B1 * | 3/2005 | Cho ............... 455/433 |
| 2005/0192035 A1 | 9/2005 | Jiang |
| 2006/0205404 A1 | 9/2006 | Gonen et al. |
| 2006/0276226 A1 | 12/2006 | Jiang |
| 2007/0173252 A1 * | 7/2007 | Jiang ............... 455/432.1 |
| 2008/0014933 A1 * | 1/2008 | Montz et al. .......... 455/433 |

FOREIGN PATENT DOCUMENTS

| CN | 1946104 A | 4/2007 |
| CN | 1997222 A | 7/2007 |
| EP | 1991019 A1 | 11/2008 |

(Continued)

OTHER PUBLICATIONS

International Search Report for PCT/KR2008/007374 filed Dec. 12, 2008.

*Primary Examiner* — Olumide T Ajibade Akonai
*Assistant Examiner* — Edward Zhang
(74) *Attorney, Agent, or Firm* — IP Legal Services, LLC

(57) ABSTRACT

Disclosed herein is a call processing system and method for mobile communication terminals. The call processing system for mobile communication terminals according to the present invention includes a gateway location register (130) for generating a Database (DB) for an international roaming service subscriber. A roaming control unit (120) registers a location of a mobile communication terminal (101), determines whether a call originates using a primary number or a secondary number in the international roaming service on a basis of originating service provider information and a called number, included in a call origination signal from the mobile communication terminal, and sends a signal corresponding to a result of the determination to a mobile switching center of a network in which the mobile communication terminal is located. The international roaming service assigns a primary number in a home network and assigns a secondary number in a partner network.

25 Claims, 18 Drawing Sheets

FOREIGN PATENT DOCUMENTS

| | | |
|---|---|---|
| JP | 2003-018644 A | 1/2003 |
| JP | 2003-061137 A | 2/2003 |
| JP | 2006-345343 A | 12/2006 |
| JP | 2007-189364 A | 7/2007 |

\* cited by examiner

CALL PROCESSING SYSTEM FOR MOBILE AND METHOD THEREOF

TECHNICAL FIELD

The present invention relates, in general, to a call processing system and method for mobile communication terminals, and, more particularly, to a call processing system and method for mobile communication terminals, which exactly process an originating call depending on whether a mobile communication subscriber originates a call using a primary number assigned by a home network or a secondary number assigned by a foreign partner network through the use of intelligent network equipment, for example, a Roaming Service Control Point (RSCP), and which allow only a text message indicating the reception of a call to the secondary number to be sent to the mobile communication terminal using the intelligent network equipment in the home network or allow the mobile communication terminal to receive the call to the secondary number through signaling between the foreign partner network and the home network and to connect the call without adding a transmission line if an originating call signal to the secondary number of the mobile communication terminal has been received in an outbound international roaming service.

BACKGROUND ART

Nowadays, with the provision of international roaming service, a subscriber to a mobile communication service such as domestic Wideband Code Division Multiple Access (WCDMA) accesses a domestic home network using the same mobile communication terminal even from abroad and is then capable of using various types of mobile communication services, for example, voice or video call service, multimedia data download/upload service, wireless Internet service, etc.

Generally, when international roaming service subscriber accesses a domestic home network from abroad, he or she presses numbers corresponding to 'International access code (1)+country code (82)+area code (010, 019, 02, 041, etc.) except the first number '0'+phone number (****-####)', and presses a send button, thus using a call or messaging service.

In this case, in a Global System for Mobile Telecommunication (GSM)/WCDMA network, a "+" key may be occasionally used as an international access code. That is, "+"+ "country code"+"area code except the first number 0" may be entered.

Further, when international roaming service subscriber accesses a network belonging to his or her country from abroad, he or she presses 'area code+phone number' and then presses a send button similar to a method using the service of a domestic network, thus using a call or messaging service.

When a home network is accessed from a foreign network in this way, the Mobile Switching Center (MSC) of the foreign network basically analyzes a called number and outputs an Integrated Services Digital Network (ISDN) User part (ISUP) call to the home network via the network of an international line service provider in the foreign network. When the ISUP call is received through the home network, the MSC of the home network queries a Home Location Register (HLR), which manages the location of a subscriber corresponding to the called number, about a routing number through a Mobile Application Part (MAP), receives the routing number, and connects the ISUP call to a called MSC using the received routing number.

Generally, the mobile communication terminal number of a subscriber is a unique identification number assigned to the mobile communication terminal of each subscriber through both an International Mobile Subscriber Identity (IMSI) number, managed by an Universal Subscriber Identity Module (USIM) card mounted on the mobile communication terminal, and a Mobile Subscriber Integrated Service Digital Network (MSISDN) number, assigned by the home network to the subscriber terminal to correspond to the IMSI number.

In particular, since a GSM/WCDMA-type mobile communication terminal can support a multi-band operation, automatic roaming is possible. Services for assigning a plurality of MSISDN numbers to a single IMSI using the characteristics of the GSM/WCDMA-type mobile communication terminal and applying the MSISDN numbers to automatic roaming have been developed. One of these services is a Single IMSI Multiple Number (SIMN) service.

That is, in such an SIMN service, a home network assigns a primary number (primary no.) to correspond to the IMSI of a subscriber mobile communication terminal, and a partner network, which concludes an agreement with the home network, assigns a secondary number (secondary no.), so that the primary and secondary numbers are applied to automatic roaming.

However, when a mobile communication subscriber who has subscribed to such an SIMN service uses international roaming service, there is a need to precisely define a method of processing an originating call depending on whether the mobile communication subscriber originates a call using the primary no. of the home network or using the secondary no. of the partner network.

Meanwhile, in a conventional outbound international roaming service, since call origination and call reception are performed using only a single MSISDN number assigned by the home network, there is a need to always identify a subscriber via the home network and perform other types of roaming logic at the time of processing calls. Accordingly, even when a called subscriber is located in the same foreign network as a network in which an outbound roamer is located, an international line between the home network and the foreign network is used, so that there is a problem in that unnecessary charges occur, thus causing a user to pay high charges.

Therefore, a system capable of efficiently supporting an international automatic roaming service profitable for the location of the subscriber, such as by allowing a relevant outbound roamer to be provided with an inexpensive international roaming service when a mobile communication subscriber who has subscribed to an SIMN service uses an outbound international roaming service, is required.

DISCLOSURE

Technical Problem

Accordingly, the present invention has been made to comply with the above requirement, and an object of the present invention is to provide a call processing system and method for mobile communication terminals, which can exactly process an originating call depending on whether a mobile communication subscriber, who subscribed to an SIMN service, originates a call using the primary number of a home network or using the secondary number of a partner network when the mobile communication subscriber uses international roaming service.

Another object of the present invention is to provide a call processing system and method for mobile communication terminals, which differentiate charges generated between a foreign partner network and a home network from charges generated between the home network and other networks which did not conclude an agreement with the home network, thus reducing the burden of a mobile communication terminal subscriber on charges imposed by a foreign partner network.

A further object of the present invention is to provide a call processing system and method for mobile communication terminals, in which a mobile communication terminal can receive only a text message indicating the reception of a call to a secondary number or can connect the call under the control of an RSCP using information set by a subscriber at the time of subscribing to international roaming service when a call to the secondary number assigned to the mobile communication terminal is received.

Yet another object of the present invention is to provide a call processing system and method for mobile communication terminals, which transmit an Unstructured Supplementary Service Data (USSD) message, indicating the reception of a call to a secondary number, to a mobile communication terminal at the time of receiving a call to the secondary number, or which insert text for the reception of a call to the secondary number into the User to User Information (UUI) field of a Send Routing Information (SRI) signal and display the text on the mobile communication terminal, thus notifying a mobile communication subscriber of the reception of the call to the secondary number.

Technical Solution

In accordance with a first embodiment of a call processing system for mobile communication terminals of the present invention to accomplish the above objects, there is provided a call processing system for mobile communication terminals, comprising a Gateway Location Register (GLR) for generating a Database (DB) for a service subscriber; and a roaming control unit for registering a location of a mobile communication terminal, determining whether a call originates using a primary number (primary No.) or a secondary number (secondary No.) in international roaming service on a basis of originating service provider information and a called number, included in a call origination signal from the mobile communication terminal, and sending a signal corresponding to a result of the determination to a mobile switching center of a network in which the mobile communication terminal is located. In this case, the international roaming service provides a Single IMSI Multiple Number (SIMN) service in which a primary number is assigned by a home network and a secondary number is assigned by a partner network.

Preferably, the mobile communication terminal originates a call by attaching an additional code to a called number at the time of originating a call to a number of some other network. In this case, the term 'some other network' means a partner network opposite that of the network of a device itself which becomes an entity for executing the operation of current international roaming service. That is, when a mobile communication terminal is located in a partner network, the partner network is the mobile communication terminal's own network, and some other network, which is the partner network thereof, is a home network. Further, when the mobile communication terminal is located in the home network, the home network is the mobile communication terminal's own network, and some other network, which is the partner network thereof, is a partner network. These are equally applied to the following description.

Preferably, the mobile switching center includes a Mobile Subscriber Integrated Service Digital Network (MSISDN) number for the mobile communication terminal's own network, and sets a calling number as the MSISDN number of its own network with respect to an originating call from the mobile communication terminal.

In accordance with a second embodiment of a call processing system for mobile communication terminals of the present invention to accomplish the above objects, there is provided a call processing system for mobile communication terminals for providing international roaming service using a primary number assigned by a home network and a secondary number assigned by a partner network, comprising a roaming control unit for determining whether a mobile communication subscriber has subscribed to the international roaming service when a call to the secondary number is received from a gateway mobile switching center of the partner network, and generating a text message indicating reception of the call to the secondary number if it is determined that the mobile communication subscriber has subscribed to the international roaming service; a location register for providing information about a location of a terminal of the mobile communication subscriber on a basis of the primary number corresponding to the secondary number; and a message sending unit for sending the text message received from the roaming control unit to the mobile communication subscriber terminal on a basis of the location information of the mobile communication subscriber terminal received from the location register.

In accordance with a third embodiment of a call processing system for mobile communication terminals of the present invention to accomplish the above objects, there is provided a call processing system for mobile communication terminals for providing international roaming service using a primary number assigned by a home network and a secondary number assigned by a partner network, comprising a roaming control unit for determining whether a mobile communication subscriber has subscribed to the international roaming service when a call to the secondary number is received from a gateway mobile switching center of the partner network; a location register for determining a location of a terminal of the mobile communication subscriber on a basis of the primary number corresponding to the secondary number if it is determined by the roaming control unit that the mobile communication subscriber has subscribed to the international roaming service, and requesting and receiving a mobile station roaming number from a mobile switching center of a network in which the mobile communication subscriber terminal, the location of which is determined, is located; and a gateway mobile switching center for receiving the mobile station roaming number transmitted from the location register and providing reception of the call to the secondary number to the mobile communication subscriber terminal on a basis of the received mobile station roaming number.

Preferably, when the mobile communication subscriber terminal has subscribed to the international roaming service, the roaming control unit determines whether the mobile communication subscriber terminal is located in the home network or the third party network, and transmits information, including both previously agreed-upon data and the primary number, to the gateway mobile switching center of the partner network if it is determined that the mobile communication subscriber terminal is located in the home network or the third party network, and the location register receives information about the primary number corresponding to the secondary number from the gateway mobile switching center of the home network which receives an Initial Address Message (IAM), including the primary number, transmitted from the gateway mobile switching center of the partner network.

Meanwhile, in accordance with a first embodiment of a call processing method for mobile communication terminals of the present invention to accomplish the above objects, there is provided a call processing method for mobile communication terminals, comprising the steps of exchanging a database for an international roaming service subscriber with respect to international roaming service for assigning a primary number in a home network and assigning a secondary number in a partner network; determining whether a mobile communication terminal has subscribed to the international roaming service and registering a current location of the mobile communication terminal; and determining whether a call originates using a primary number or a secondary number in the international roaming service on a basis of originating service provider information and a called number received from the mobile communication terminal, and transmitting a signal corresponding to a result of the determination to a mobile switching center of a network in which the mobile communication terminal is located.

Preferably, the database exchanged at the exchange step includes a range of MSISDN band of the home network of the international roaming service subscriber and a range of MSISDN band of the partner network.

Preferably, the call processing method further comprises the steps of when the mobile communication terminal is located in the partner network, a gateway location register acquiring a subscriber profile from a home location register in response to a location registration signal received from the mobile communication terminal, and transmitting the subscriber profile to a Serving GPRS Support Node (SGSN) of the partner network; and the gateway location register receiving an acknowledgement (ack) message from the SGSN of the partner network. Preferably, the roaming control unit updates the location information of the subscriber on a basis of the ack message from the SGSN.

Preferably, the call processing method further comprises the steps of when the mobile communication terminal is located in the partner network, a gateway location register acquiring a subscriber profile from a home location register in response to a location registration request signal received from the partner network and transmitting the subscriber profile to the partner network; and the gateway location register receiving an ack message from the partner network. Preferably, the roaming control unit updates the location information of the subscriber on a basis of the ack message received from the partner network.

Preferably, when the mobile communication terminal originates a call using a number of some other network, a mobile switching center of the mobile communication terminal's own network sets a calling number as a number of the other network on a basis of a special prefix assigned to a called number.

In accordance with a second embodiment of a call processing method for mobile communication terminals of the present invention to accomplish the above objects, there is provided a call processing method for mobile communication terminals using a primary number assigned by a home network and a secondary number assigned by a partner network, comprising the steps of when a call to the secondary number is received, determining whether a mobile communication subscriber having the secondary number has subscribed to international roaming service; generating a text message indicating reception of the call to the secondary number if it is determined that the mobile communication subscriber has subscribed to the international roaming service; and sending the generated text message to a terminal of the mobile communication subscriber.

Preferably, the step of determining whether the mobile communication subscriber has subscribed to the international roaming service is performed when a roaming control unit of the home network receives a Send Routing Information (SRI) signal for the secondary number from a gateway mobile switching center of the partner network.

Preferably, the call processing method further comprises the step of determining a location of the mobile communication subscriber terminal, and the text message is transmitted to the mobile communication subscriber terminal on a basis of the determined location of the mobile communication subscriber terminal.

Preferably, when the mobile communication subscriber terminal is located in the partner network or a third party network and a call to the primary number is received, a text message indicating reception of the call to the primary number is generated and is sent to the mobile communication subscriber terminal.

In accordance with a third embodiment of a call processing method for mobile communication terminals of the present invention to accomplish the above objects, there is provided a call processing method for mobile communication terminals using a primary number assigned by a home network and a secondary number assigned by a partner network, comprising the steps of determining whether a mobile communication subscriber having the secondary number has subscribed to international roaming service when a call to the secondary number is received; determining a location of a terminal of the mobile communication subscriber using a primary number corresponding to the secondary number if it is determined that the mobile communication subscriber has subscribed to the international roaming service; and transferring reception of the call to the secondary number to the mobile communication subscriber terminal through a mobile switching center corresponding to the determined location.

Preferably, if it is determined that the mobile communication subscriber terminal has subscribed to the international roaming service, an Unstructured Supplementary Service Data (USSD) message, indicating that the call to the secondary number has been received, is sent to the mobile communication subscriber terminal.

Preferably, the determination about whether the mobile communication terminal has subscribed to the international roaming service is performed by a roaming control unit of the home network which receives a Send Routing Information (SRI) signal for the secondary number from a gateway mobile switching center of the partner network, and the determination of the location of the mobile communication subscriber terminal is performed by a location register of the home network which receives a send routing information signal including the primary number.

Preferably, the call processing method may further comprising the steps of determining whether the mobile communication subscriber terminal is located in the home network or a third party network if it is determined that the mobile communication subscriber has subscribed to the international roaming service; the roaming control unit of the home network sending a signal, including previously agreed-upon data and the primary number, to the gateway mobile switching center of the partner network if it is determined that the mobile communication subscriber terminal is located in the home network or the third party network; and a gateway mobile switching center of the home network receiving an Initial Address Message (IAM), including the primary number, from the gateway mobile switching center of the partner network, and transmitting a send routing information signal, including the primary number, to a location register of the home network.

Preferably, the call processing method further comprises the step of the roaming control unit of the home network sending the send routing information signal, including the primary number, to the location register of the home network if it is determined that the mobile communication subscriber is located in the partner network.

Preferably, the call processing method further comprises the step of the gateway mobile switching center of the partner network generating billing data (Call Data Records: CDR) of the mobile communication subscriber terminal between the partner network and the home network on a basis of the previously agreed-upon data.

Preferably, the call processing method further comprises the step of the gateway mobile switching center of the home network generating billing data (CDR) of the mobile communication subscriber terminal between the home network and the third party network if it is determined that the mobile communication subscriber terminal is located in the third party network.

Preferably, the signal and the IAM transmitted by the roaming control unit of the home network to the gateway mobile switching center of the partner network further comprise text information for reception of a call to the secondary number, and the mobile communication subscriber terminal displays the text information for the reception of the call to the secondary number on a screen at a time of receiving the call.

Preferably, the call processing method further comprises the steps of determining whether the mobile communication subscriber terminal is located in the home network or the third party network if it is determined that the mobile communication subscriber has subscribed to the international roaming service; the roaming control unit of the home network transmitting information for changing processing of an intelligent network (Termination CAMEL Subscription Information: TCSI) to the gateway mobile switching center of the partner network and receiving an Initiate Detect Point (IDP) signal from the gateway mobile switching center of the partner network when the mobile communication subscriber terminal is located in the home network or the third party network; the roaming control unit of the home network transmitting an RRB/CONNECT signal, including previously agreed-upon data and the primary number, to the gateway mobile switching center of the partner network; and the gateway mobile switching center of the home network receiving an Initial Address Message (IAM), including the primary number, from the gateway mobile switching center of the partner network, and transmitting a send routing information signal, including the primary number, to a location register of the home network.

Preferably, the call processing method further comprises the steps of the roaming control unit of the home network receiving information about call connection and call termination of the mobile communication subscriber terminal from the gateway mobile switching center of the partner network; and the roaming control unit of the home network generating billing data of the mobile communication subscriber terminal between the partner network and the home network on a basis of the received call connection and call termination information.

Preferably, the step of determining whether the mobile communication subscriber terminal is located in the home network or the third party network is performed by the roaming control unit of the home network or a home location register of the home network.

ADVANTAGEOUS EFFECTS

The call processing system and method for mobile communication terminals according to the present invention can exactly process an originating call depending on whether a mobile communication subscriber, who has subscribed to an SIMN service, originates a call using the primary number of a home network or using the secondary number of a partner network when the mobile communication subscriber uses international roaming service.

Further, the call processing system and method for mobile communication terminals according to the present invention provide information about the reception of a call to the secondary number of a mobile communication terminal, which subscribed to international roaming service for providing a communication service using a primary number in a home network and using a secondary number in a foreign partner network, through the use of an existing international transmission line which has already been constructed, without adding an international transmission line between the foreign partner network and the home network, thus reducing costs required for the construction of the system.

Further, the call processing system and method for mobile communication terminals according to the present invention differentiate charges generated between a foreign partner network and a home network from charges generated between the home network and other networks, which did not conclude an agreement with the home network, thus reducing the burden of charges imposed on a mobile communication terminal subscriber.

Furthermore, the call processing system and method for mobile communication terminals according to the present invention are constructed such that a mobile communication terminal receives only a text message indicating the reception of a call to a secondary number or connects the call in response to the reception of the call to the secondary number under the control of an RSCP control using information set by a subscriber at the time of subscribing to international roaming service when the call to the secondary number is received.

In addition, the call processing system and method for mobile communication terminals according to the present invention send a USSD message, indicating the reception of a call to a secondary number, to a mobile communication terminal at the time of receiving the call to the secondary number, or insert text for the reception of a call to the secondary number into the UUI field of a Send Routing Information (SRI) information and displays the text on the mobile communication terminal, thus notifying a mobile communication subscriber of the reception of the call to the secondary number.

BEST MODE

Hereinafter, embodiments of a call processing system and method for mobile communication terminals according to the present invention will be described in detail with reference to the attached drawings.

In the description of the present invention, a mobile communication terminal according to the present invention may not only be a cellular phone, a Personal Communications Services (PCS) phone or a synchronous/asynchronous International Mobile Telecommunication-2000 (IMT-2000) terminal, but may also include any communication device, such as a notebook Personal Computer (PC), a desktop PC, a palm PC, a Personal Digital Assistant (PDA), a smart phone, a Wireless Application Protocol (WAP) phone, and a mobile play-station, provided it is capable of supporting a mobile communication service.

Figure 1:
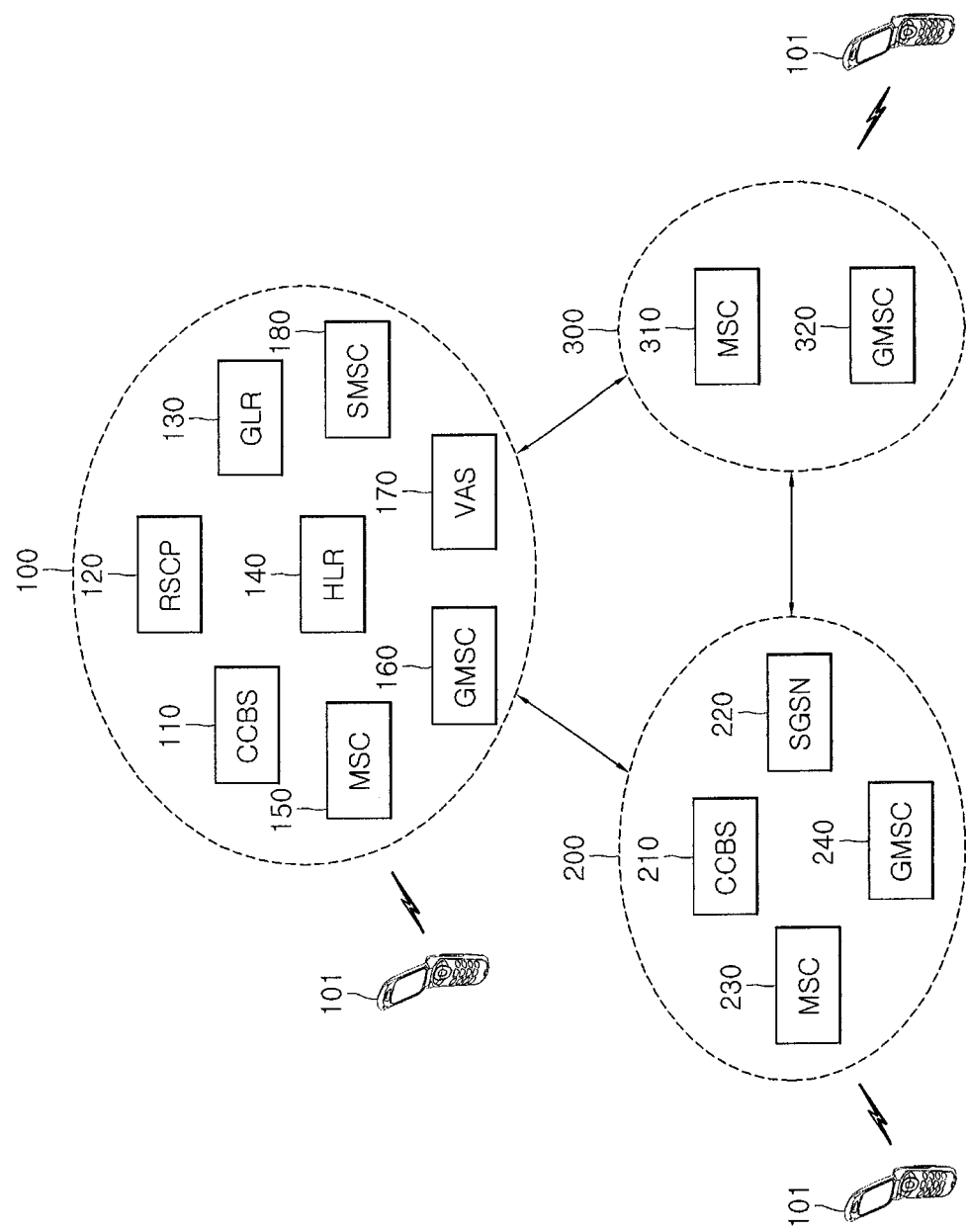
FIG. 1 is a diagram schematically showing a call processing system for mobile communication terminals according to the present invention.

FIG. 1 is a diagram schematically showing a call processing system for mobile communication terminals according to the present invention.

Referring to the drawing, the call processing system for mobile communication terminals according to the present invention includes a home network 100, a partner network 200, and a third party network 300.

Here, the home network 100 refers to a domestic network in which a communication network to which a mobile communication terminal 101 has subscribed is present, and includes a Customer Care Billing System (CCBS) 110, a Roaming Service Control Point (RSCP) 120, a Gateway Location Register (GLR) 130, a Home Location Register (HLR) 140, a Mobile Switching Center (MSC) 150, a Gateway Mobile Switching Center (GMSC) 160, a Value Added System (VAS) 170, and a Short Message Service Center (SMSC) 180.

Further, the partner network 200 is a network which has concluded an agreement with the home network 100 in international roaming service and is differentiated from the third party network 300 existing in a foreign country, and includes a CCBS 210, a Serving GPRS Support Node (SGSN) 220, a MSC 230, and a GMSC 240.

Further, the third party network 300 is the mobile communication network of a country other than the home network 100 and the partner network 200, and includes a MSC 310 and a GMSC 320.

In the system of FIG. 1, the home network 100, partner network 200 and the third party network 300 are assumed to be capable of providing Circuit Switch (CS) domain services, such as voice or video call service based on circuit channels, and Packet Switch (PS) domain services, such as the downloading or uploading of multimedia data based on data channels, wireless Internet service, or portable Internet service, to the mobile communication terminals 101 of respective networks. Hereinafter, for example, a description will be made under the assumption that respective mobile communication services are provided based on WCDMA, but the present invention is not limited to this example, and may be variously applied to Global System for Mobile Communications (GSM), IMT2000, and CDMA2000 depending on the mobile communication environment of each foreign or home network.

Further, a message indicating the reception of a call to a secondary number or a primary number has been described as a short message (SMS), but the message of the present invention is not limited to this example, and all messaging methods capable of providing notification to a mobile communication subscriber, such as a Long Message Service (LMS) or a Multimedia Message Service (MMS), instead of the SMS, can be applied.

In addition, although not shown in FIG. 1, the mobile communication terminal can be provided with the PS domain service of a General Packet Radio Service (GPRS) network, such as the downloading or uploading of multimedia data, wireless Internet service or portable Internet service depending on the call processing control of a Serving GPRS Service Node (SGSN) and a Gateway GPRS Support Node (GGSN).

The system of the present invention uses two terminal numbers assigned to the mobile communication terminal provided with international roaming service, that is, a primary number assigned by the home network 100 (primary number=MSISDN of home network=P#) and a secondary number assigned by the partner network 200 (secondary number=MSISDN of partner network=S#) as the identification numbers of the terminal.

Further, the mobile communication terminal according to the present invention includes a Universal Subscriber Identity Module (USIM) card or the like. The number of International Mobile Subscriber Identity (IMSI) numbers managed in the USIM card or the like is one, but one Mobile Subscriber Integrated Service Digital Network (MSISDN) number corresponding to the one IMSI number is assigned by the home network 100 as a primary number, and the other preset MSISDN number is assigned by the partner network 200 as a secondary number. Hereinafter, such a mobile communication subscriber terminal is assumed to be a Single IMSI Multiple Number (SIMN) service subscriber terminal.

The CCBSs 110 and 210 are configured to manage billing data generated in the home network 100, the partner network 200, and the third party network 300. The CCBS 110 of the home network 100 receives the billing data generated by the CCBS 210 of the partner network 200 or the third party network 300, and manages the billing data of the mobile communication terminal subscriber. Further, the CCBSs 110 and 210 exchange information about the range of the MSISDN band of the primary number of the home network 100 and information about the range of the MSISDN band of the secondary number of the partner network 200, and store the exchanged information. The exchange of information about the ranges of MSISDN bands may be performed either online or offline.

The RSCP 120 is intelligent network equipment for controlling international roaming service, and is configured to register information about the location of the subscriber on the basis of a location registration signal received from the subscriber to an SIMN service and processes an originating call on the basis of the called number of a call originating from the subscriber. Further, when a Send Routing Information (SRI) signal for the secondary number of the mobile communication terminal 101 is received from the partner network 200, the RSCP 120 determines whether the mobile communication terminal 101 has subscribed to the SIMN service, and controls the reception of a call to the secondary number if it is determined that the mobile communication terminal 101 has subscribed to the SIMN service.

When the mobile communication subscriber provided with the international roaming service subscribes to the SIMN service, the RSCP 120 can perform an operation for the reception of a call to the secondary number on the basis of information set by the subscriber at the time of subscribing to the SIMN service. Here, it is assumed that there are items, such as (1) the reception of call reception information using a short message (SMS), and (2) call connection, which are items set by the subscriber for the reception of a call to a secondary number at the time of subscribing to the SIMN service.

However, an operation for the reception of a call to a secondary number performed by the RSCP 120 may be set so that a short message is sent or a call is directly connected when a call to the secondary number is received depending on the location of an SIMN service subscriber, that is, depending on whether the SIMN service subscriber is located in the home network 100, the partner network 200 or the third party network 300, without being performed according to the setting by the SIMN service subscriber.

A description of the operation of sending a short message or directly connecting a call when a call to the secondary number is received will be made later. In this case, an SMS item or a call connection item which is set regardless of the location of a subscriber at the time of subscribing to the SIMN service is briefly described.

(1) Case where Item for Receiving Call Reception Information through SMS is Set

The RSCP 120 receives an SRI signal for the secondary number of the mobile communication terminal from the GMSC 240 of the partner network 200, generates the contents of a short message, indicating that a call to the secondary number has been received, through the call reception information reception item if it is determined that the mobile communication terminal subscriber has subscribed to the SIMN service, and sends to the GMSC 240 of the partner network 200 a response signal (SRI Acknowledgement: ack) to the SRI signal.

At this time, the SRI ack signal may be a response signal indicating the impossibility of the reception of a call to the secondary number of the mobile communication terminal. For example, the RSCP 120 outputs an SRI ack signal to the GMSC 240 of the partner network 200 so that a voice message, indicating that a called terminal cannot receive the call, can be output to a calling terminal through the GMSC 240 of the partner network 200.

(2) Case where Call Connection Item is Set

The RSCP 120 receives an SRI signal for the secondary number of the mobile communication terminal from the GMSC 240 of the partner network 200. If it is determined that the mobile communication terminal subscriber has subscribed to the SIMN service, the RSCP 120 performs the reception of a call to the secondary number of the mobile communication terminal through a call connection item which is an item set at the time of subscription.

At this time, the RSCP 120 may send a USSD message to the mobile communication terminal in order to notify the mobile communication terminal subscriber that the call to the secondary number has been received, or may receive a Mobile Subscriber Roaming Number (MSRN) for a primary number from the HLR 140, may include text, required to indicate that the call to the secondary number has been received, in an SRI ack signal and may transmit the SRI ack signal with the text when transmitting an SRI ack signal to the GMSC of the partner network 200 which transmitted the SRI signal for the secondary number. The text required to indicate the reception of the call to the secondary number may be included in a UUI field.

That is, the mobile communication terminal subscriber may recognize that the call to the secondary number has been received on the basis of the USSD message provided by the RSCP 120 to the mobile communication terminal, or on the basis of the text stored in the UUI field of the SRI signal transmitted from the HLR 140 displayed on the screen of the mobile communication terminal at the same time that the call is received at the mobile communication terminal.

In this case, the RSCP 120 may allow both data previously agreed upon with the partner network 200 (hereinafter referred to as a "special prefix: PFX") and a primary number to be included in an SRI ack signal for the secondary number. The GMSC 240 of the partner network may use the special PFX when differentiating between billing data generated between the partner network 200 and the home network 100 and billing data generated between the home network and some other non-agreed-upon network. For example, the GMSC 240 of the partner network 200 bills a subscriber for "A" won as a charge per hour between the partner network 200 and some other network 300, and bills the subscriber for "B" Won (B<A) as a charge per hour between the partner network 200 agreed upon using the special PFX and the home network 100, thus differentiating the billing data between some other network and the home network 100 through the special PFX.

Further, in order to generate billing data in the home network 100 rather than the partner network 200, the RSCP 120 may transmit an SRI ack signal for the secondary number, including Termination Customized Applications for Mobile network Enhanced Logic (CAMEL) Subscription Information (TCSI) information for changing the processing of an intelligent network, to the GMSC 240 of the partner network 200, receive an IDP signal from the GMSC 240 of the partner network 200, and then transmit an RRB/CONNECT signal, including the special PFX and the primary number, to the GMSC 240 of the partner network 200. That is, the RSCP 120 receives from the GMSC 240 of the partner network 200 information about the time point at which the call starts according to the reception of the call to the secondary number of the mobile communication terminal and information about the time point at which the communication is terminated, thus generating billing data between the partner network 200 and the home network 100. A detailed operation thereof will be described with reference to an originating call processing method for mobile communication terminals according to the present invention.

Of course, when the subscriber subscribes to international roaming service, only an item that can be set for a secondary number is not necessarily present. In other words, an item that can be set for the reception of the call to a primary number may exist, and international roaming service for the primary number can be provided through the set item.

For example, the item set by the subscriber in relation to the reception of a call to the primary number may be an item enabling the reception of only a short message indicating that a call to the primary number has been received when the mobile communication terminal 119, 124 or 131 is located in the partner network 200 or the third party network 130 rather than in the home network 100.

That is, the mobile communication terminal receives a short message indicating the reception of a call to the primary number or to the secondary number or connects the call through the reception of the call on the basis of the item for setting the reception of a call or the reception of only a short message in the case where a call to the primary number or the secondary number is received when the mobile communication subscriber subscribes to the SIMM service, and depending on the current location of the subscriber, for example, depending on whether the subscriber is located in the home network 100, the partner network 200 or the third party network 300.

For example, when it is assumed that the subscriber is designated to receive only a short message in the case where a call to a primary number is received and the subscriber is located in the partner network 200 and to connect the call regardless of a network in which the subscriber is located when a call to a secondary number is received, the RSCP 120 or the GMSC 160 of the home network 100 generate a short message, indicating that the call to the primary number has been received, transmits the short message to the mobile communication terminal when the call to the primary number has been received while the subscriber is located in the partner network 200, and performs the reception of a call at the mobile communication terminal under the control of the RSCP 120 to connect the call when the call to the secondary number has been received.

The GLR 130 is also called a gateway location register, and is configured to function as the HLR with respect to the other network. Further, the GLR 130 generates the DB of each SIMN service subscriber on the basis of information about the MSISDN range of the SIMN service subscriber between the CCBS 210 of the partner network 200 and the CCBS 110 of the home network 100. Further, when the mobile communication terminal is located in the partner network 200, the GLR 130 requests and receives an MSRN from the MSC 230 of the partner network 200, and transmits the MSRN to the HLR 140.

The HLR 140 is also called a home location register, and is the DB of each mobile communication subscriber having the terminal information, subscription information and location information of the subscriber and having a function of authenticating the subscriber in the MSC. When the reception of a call to a primary number or a secondary number occurs, the HLR 140 receives an SRI signal from the GMSC 160, requests and receives an MSRN from the MSC of a network in which the mobile communication terminal is located on the basis of the location information of the mobile communication terminal, and transmits the received MSRN to the GMSC 160 or the RSCP 120.

In this case, when the mobile communication terminal is located in the home network 100 or the third party network 300, the HLR 140 transmits an MSRN to the GMSC 160 because an SRI signal was received from the GMSC 160. When the mobile communication terminal is located in the partner network 200, the HLR 140 transmits an MSRN to the RSCP 120 because an SRI signal was received from the RSCP 120.

Each of the MSCs 150, 230 and 310 is also called a mobile switching center, and is configured to provide a circuit-switched service to the mobile communication subscriber through network interworking with a fixed network. The MSC 150, 230 or 310 functions to constitute an access point for user traffic between different MSCs existing in a mobile communication network and a public telephone network or in the same mobile communication network or different mobile communication networks. Further, the MSC 150, 230 or 310 additionally functions to always provide a mobile phone service by tracking the location of a mobile phone subscriber, and has a call channel switching (hand-off) function of enabling communication service to be continuously provided even if locations change.

In this case, when a Provide Roaming Number (PRN) signal required to request an MSRN is received from the HLR 140, the MSC 150 transmits a PRN ack signal, including the MSRN, to the HLR 140. When an IAM signal is received from the GMSC 160, the MSC 150 connects a received call to the mobile communication terminal using the MSRN included in the IAM signal.

When a PRN signal required to request an MSRN is received from the GLR 130 of the home network 100, the MSC 230 transmits a PRN ack signal, including the MSRN, to the GLR 130 of the home network 100, and connects a received call to the mobile communication terminal when an IAM signal is received from the GMSC 240.

Each of the GMSCs 160, 240 and 320 is also called a gateway mobile switching center, and functions to query the HLR 140 about the location of the called subscriber of a Mobile Application Part (MAP) and to connect a call to a called MSC using the MSRN received as a result of the query when a called number is the number of its own network. Further, when a called number is the number of some other network, each of the GMSCs 160, 240 and 320 connects an ISUP call to the GMSC of the other network, thus enabling the call to be received at the GMSC of the other network.

At this time, when a call to the secondary number of the mobile communication terminal is received, the GMSC 160 may receive an Initial Address Message (IAM) signal, including a primary number corresponding to the secondary number, from the GMSC 240 of the partner network 200, and may transmit an SRI signal, including the primary number, to the HLR 140 and transmit the IAM signal to an MSC corresponding to the MSRN. That is, when the MSRN means the MSC of the home network 100, the GMSC 160 transmits the IAM signal to the MSC 150 of the home network 100. Further, when the MSRN means the MSC of the third party network 300, the GMSC 160 transmits the IAM signal to the MSC 310 of the third party network 300. Here, the MSRN is a number for routing the call between a mobile communication terminal which originates the call and a mobile communication terminal which receives the call. The IAM signal is a signal including a number and other types of information required for call processing and routing.

Further, the GMSCs 240 and 320 perform the same functions as the GMSC 160 of the home network 100. In the present invention, when a call to the secondary number of the mobile communication terminal is received, the GMSCs 240 and 320 transmit an SRI signal, including the secondary number, to the RSCP 120, and receive an SRI ack signal from the RSCP 120. At this time, the SRI ack signal received from the RSCP 120 may be a signal indicating the impossibility of the reception of a call to the secondary number, or a signal including both data previously agreed upon with the home network 100 and a primary number.

In this case, when receiving the SRI ack signal including both the previously agreed-upon data and the primary number, the GMSC 240 transmits an IAM signal, including the primary number, to the GMSC 160 of the home network 100.

Here, the SRI ack signal received from the RSCP 120 may be a signal including TCSI. The GMSC 240 may transmit both a call connection event based on the reception of the call to the secondary number of the mobile communication terminal and a call termination event to the RSCP 120 so that the RSCP 120 can generate billing data between the partner network 200 and the home network 100.

The VAS 170 accesses the SMSC 180 through a Short Message Client Interface (SMCI) which uses Transmission Control Protocol/Internet Protocol (TCP/IP) as a basic protocol. The VAS 170 processes all additional information services through a function of accessing the SMSC 180, and performs functions, such as entire subscriber management for a Short Message Service (SMS), billing management and operation management.

The SMSC 180 is also called a message sending unit, and is configured to receive a short message, which is generated by the RSCP 120 through the VAS 170 and which indicates the reception of a call to a secondary number, to transmit an SRI signal for SMS to the HLR 140, to receive an SRI ack signal, including the MSC (or SGSN information) Global Title (GT) of a network in which a called subscriber is located, from the HLR 140, and sends a short message to the called subscriber using the MSC GT. Here, the GT is a value required for routing in a SCCP layer, and used in the same concept as is the Internet Protocol (IP).

The SGSN 220 is also called a serving GPRS support node, and functions to transfer data packets to or from a Mobile Station (MS) in a service area. In addition, the SGSN 220 performs functions, such as packet routing and transmission, mobility management, logical link management, and authentication and billing.

Mode for Invention

Figure 2:
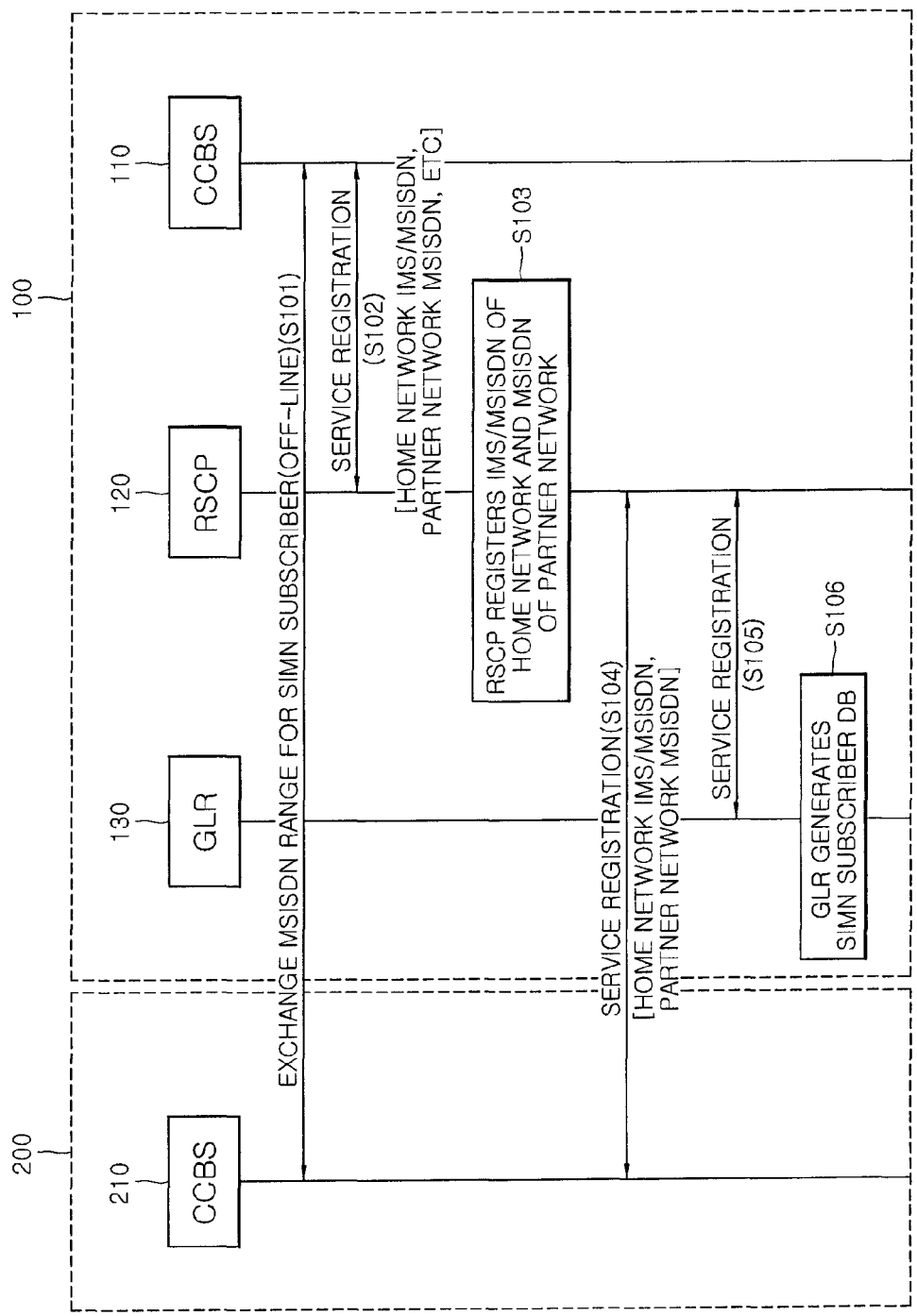
FIG. 2 is a flowchart showing the database generation process performed by GLR according to the call processing system for the mobile communication terminals of FIG. 1.

FIG. 2 is a flowchart showing a DB generation process performed by the GLR according to the call processing system for mobile communication terminals of FIG. 1.

Referring to FIG. 2, the CCBS 110 of the home network 100 and the CCBS 210 of the partner network 200 exchange information about both an MSISDN range for an SIMN service subscriber in the home network 100 and an MSISDN range for the SIMN service subscriber in the partner network 200 with each other at step S101. The SIMN service is configured to assign two MSISDN numbers to a single IMSI. At this time, the MSISDN number assigned by the home network 100 is called a primary number (primary no.), and the MSISDN number assigned by the partner network 200 is called a secondary number (secondary no.). The exchange of the primary number and the secondary number may be performed either offline or online.

The CCBS 110 of the home network 100 transmits to the RSCP 120 information about the MSISDN number of the secondary number in the partner network 200, together with information about the International Mobile Station Identity (IMSI)/MSISDN number of the primary number in the home network 100, thus registering a relevant service at step S102.

The RSCP 120 registers and stores information about the IMSI/MSISDN number of the primary number of the home network 100 and information about the secondary number of the partner network 200 at step S103. Further, the RSCP 120 notifies the CCBS 210 of the partner network 200 of the registration of services with each other at step S104, and registers information about the SIMN service in the GLR 130 of the home network 100 at step S105.

The GLR 130 generates the DB of the SIMN service subscriber on the basis of the service registration information received from the RSCP 120 at step S106.

Figure 3:
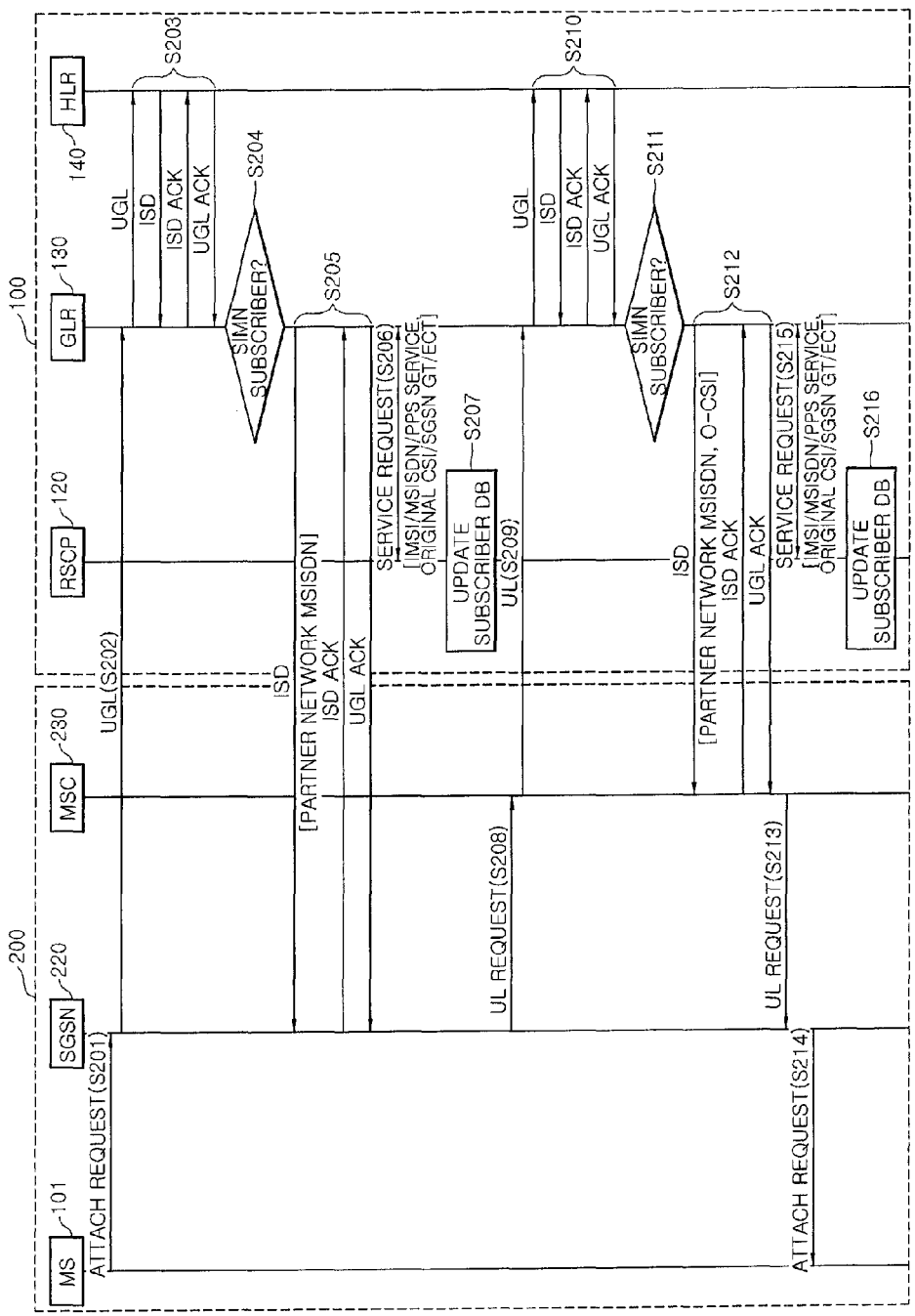
FIG. 3 is a flowchart showing a subscriber location information update process performed by RSCP according to the call processing system for the mobile communication terminals of FIG. 1.

FIG. 3 is a flowchart showing a subscriber location information update process performed by RSCP according to the call processing system for the mobile communication terminals of FIG. 1.

In the case where a mobile communication terminal (hereinafter also referred to as a 'Mobile Station (MS)') 101 of the home network 100 is present in the partner network 200, when a location registration signal from the MS 101 is transferred to the SGSN 220 of the partner network 200 at step S201, the SGSN 220 of the partner network 200 transmits an Update GPRS Location (UGL) signal to the GLR 130 of the home network 100 at step S202. The UGL transmitted from the SGSN 220 to the GLR 130 basically includes the GT of the SGSN 220.

The GLR 130 of the home network 100 transmits the received UGL signal to the HLR 140, and receives an Insert Subscriber Data (ISD) message from the HLR 140 at step S203. In this case, the ISD message is a message by which the HLR 140 transmits a subscriber profile to the SGSN 120. Thereafter, an ISD ack signal from the GLR 130 to the ISD message and a UGL ack signal from the HLR 140 to the UGL signal are subsequently exchanged.

After the ack signal to the UGL signal transmitted to the HLR 140 has been received, the GLR 130 determines whether the MS 101 has subscribed to the SIMN service at step S204. If it is determined that the MS 101 is a subscriber to the SIMN service, the GLR 130 sends an ISD message to the SGSN 220 of the partner network 200. At this time, the MSISDN number included in the ISD message received by the GLR 130 from the HLR 140 is a primary number. The GLR 130 includes the MSISDN number of a secondary number in the ISD message, which will be transmitted to the SGSN 220 of the partner network 200, and transmits the resulting ISD message. The UGL basically includes the IMSI of the mobile communication subscriber. Both the RSCP 120 and the GLR 130 manage the IMSI, the primary number (primary MSISDN) and the secondary number (secondary MSISDN) of the SIMN service subscriber. Therefore, the GLR 130 can determine whether the mobile communication subscriber is a subscriber to the SIMN service on the basis of the IMSI included in the UGL. Further, the GLR can determine whether the location of the subscriber has been registered in the partner network, to which the SIMN service is applied, on the basis of the GT of the SGSN 220 included in the UGL.

Further, the GLR 130 sends a UGL ack signal to the SGSN 220 in response to an ISD ack signal received from the SGSN 220 of the partner network 200 at step S205, and transmits location registration information to the RSCP 120.

The RSCP 120 registers information (SGSN GT) about the network, in which the mobile communication subscriber is located, in the DB on the basis of the location registration information received from the GLR 130, and manages the registered information at steps S206 and S207. Referring to the flow of a call, the UGL transmitted from the SGSN 220 to the GLR 130 includes the GT of the SGSN 220, which is registered and managed by the RSCP 120.

Meanwhile, the SGSN 220 of the partner network 200 transmits an Update Location (UL) request signal to the MSC 230 of the partner network 200 in response to a UGL ack signal received from the GLR 130 at step S208. The MSC 230 sends a UL signal to the GLR 130 of the home network 100 at step S209, and the GLR 130 retransmits the UL signal to the HLR 140. The UL transmitted from the MSC 230 to the GLR 130 basically includes the GT of the MSC 230.

The HLR 140 transmits an ISD message to the GLR 130 in response to the received UL signal, and an ISD ack signal and a UL ack signal are exchanged between the GLR 130 and the HLR 140 at step S210.

After an ack signal has been received in response to the UGL transmitted to the HLR 140, the GLR 130 determines whether the subscriber has subscribed to the SIMN service at step S211. If it is determined that the subscriber is the SIMN service subscriber, the GLR 130 transmits an ISD message to the MSC 230 of the partner network 200. At this time, the MSISDN number included in the ISD message received by the GLR 130 from the HLR 140 is a primary number. The GLR 130 includes the MSISDN number of the secondary number in the ISD message, which will be transmitted to the MSC 230 of the partner network 200, and then transmits the resulting ISD message. Whether location registration is performed in the partner network 200 may be determined by identifying information about the service provider of a network in which a roamer is located with reference to the GT information included in the UGL or UL signal. For example, in the case of KTF, a GT value included in the UGL/UL signal or the like has the form of 821029XXXXXX. In the case of DCM of Japan, a GT value has the form of 8190542XXXXXX. Therefore, the network of a service provider in which the roamer is located can be identified with reference to the GT included in the UGL/UL.

The GLR 130 sends an Update Location (UL) ack signal in response to an ISD ack signal received from the MSC 230 of the partner network 200 at step S212. The MSC 230 of the partner network 200 sends a UL ack signal to the SGSN 220, and the SGSN 220 permits the attachment of the MS 101 in response to the UL ack signal at steps S213 and S214.

Further, the GLR 130 transmits location registration information to the RSCP 120, and the RSCP 120 registers information about a network (MSC GT), in which the mobile communication subscriber is located, in the DB on the basis of the location registration information received from the GLR 130, and manages the registered information at steps S215 and S216. Referring to the flow of a call, a UL signal transmitted from the MSC 230 to the GLR 130 includes the GT of the MSC 230, which is registered and managed by the RSCP 120.

Figure 4:
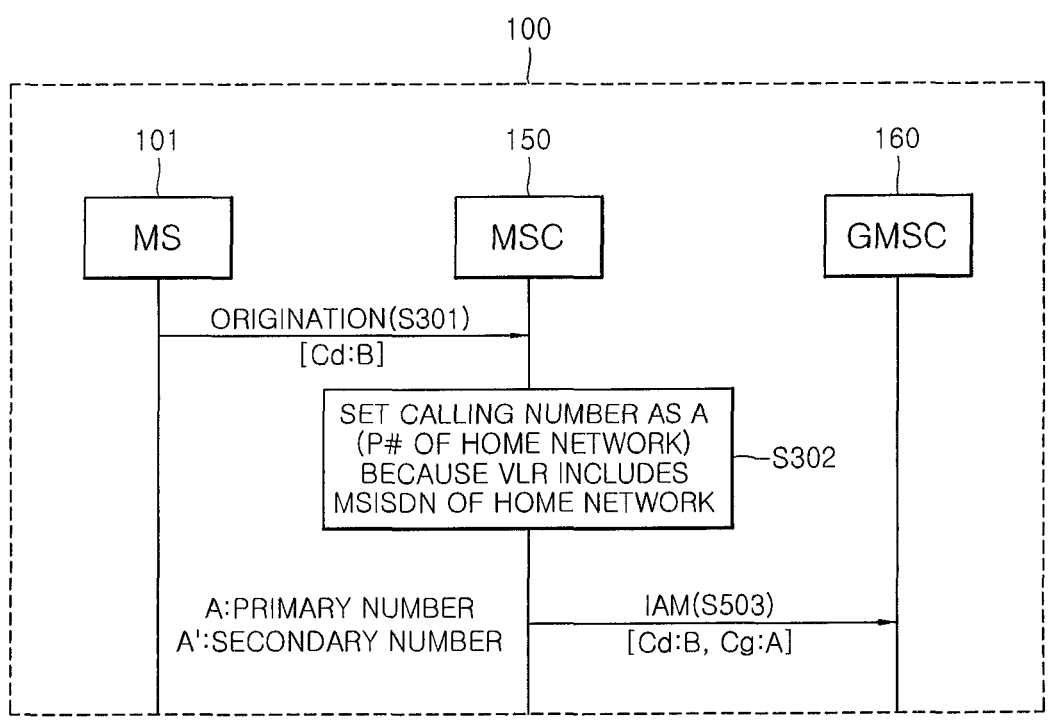
FIG. 4 is a flowchart showing an originating call processing method performed when a call originates using a primary number in a home network according to the call processing system for the mobile communication terminals of FIG. 1.

FIG. 4 is a flowchart showing an originating call processing method performed when a call originates using a primary number in a home network according to the call processing system for mobile communication terminals of FIG. 1.

Referring to the drawing, when the MS 101 transmits a call origination signal, which has B as a called number in the home network 100, at step S301, the MSC 150 of the home network 100 sets a calling number as the primary number of the home network 100 because a Visitor Location Register (VLR) (not shown) includes the MSISDN number of the home network 100 at step S302. Accordingly, the MSC 150 sends an Initiate Address Message (IAM) in which the called number is set as B and the calling number is set as A to the GMSC 160 at step S303.

Figure 5:
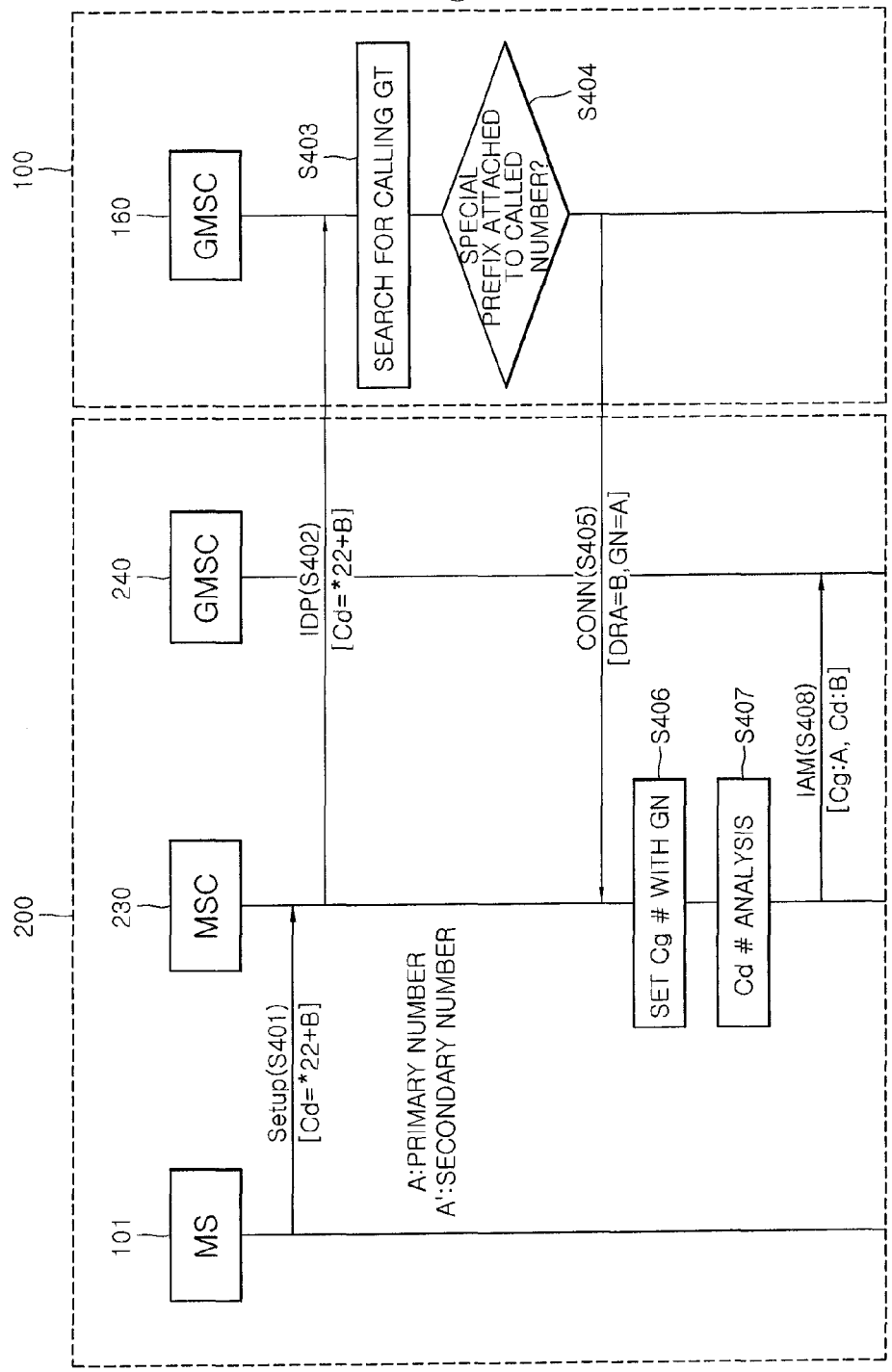
FIG. 5 is a flowchart showing an originating call processing method when a call originates using a primary number in a partner network according to the call processing system for the mobile communication terminals of FIG. 1.

FIG. 5 is a flowchart showing an originating call processing method performed when a call originate using a primary number in a partner network according to the call processing system for mobile communication terminals of FIG. 1.

When the MS 101 subscribed to the home network 100 originates a call using a primary number in the partner network 200 at step S401, the MSC 230 of the partner network 200 sends an Initiate Detect Point (IDP) message to the RSCP 120 of the home network 100 in order to process an intelligent network before call origination is processed because a subscriber profile is set as an intelligent network subscriber at the time of location registration at step S402. Here, the IDP message is a message by which the MSC/SGSN request a Service Control Point (SCP) to drive service logic on the basis of intelligent network information (CSI: CAMEL Subscription Information). Further, in the case where the MS 101 originates a call using a primary number in the partner network 200, it is preferable to originate a call with an additional code (also called a 'special prefix') attached before the called number, so as to distinguish the above case from the case where a call originates using a secondary number in the partner network 200. In the drawing, an example in which a special prefix '*22' is attached before the called number is shown (the case where a call originates using a secondary number in the partner network 200 will be described later). However, such a special prefix may be attached after a called number depending on the type of mobile communication terminal.

The RSCP 120 of the home network 100 may determine whether a network is a partner network for providing the change of a calling number by searching the received IDP message for the GT information of a calling MSC at step S403, and may determine whether a special prefix is attached to a called number at step S404.

If it is determined that a special prefix is attached before a called number, the RSCP 120 determines that a call originates using a primary number in the partner network 200, and sends a connect signal (CONN signal) corresponding to the originating call to the MSC 230 of the partner network 200 at step S405. In this case, the signal transmitted from the RSCP 120 to the partner network 200 may preferably include a signal required to set a Destination Routing Address (DRA) as B (called number), and Generic Number (GN) as A (primary number).

On the basis of the CONN signal received from the RSCP 120 of the home network 100, the MSC 230 of the partner network 200 sets the calling number of the MS 101 as GN, that is, a primary number (A) at step S406, analyzes a called number at step S407, and transmits an IAM in which a calling number is A and a called number is B to the GMSC 240 at step S408.

Figure 6:
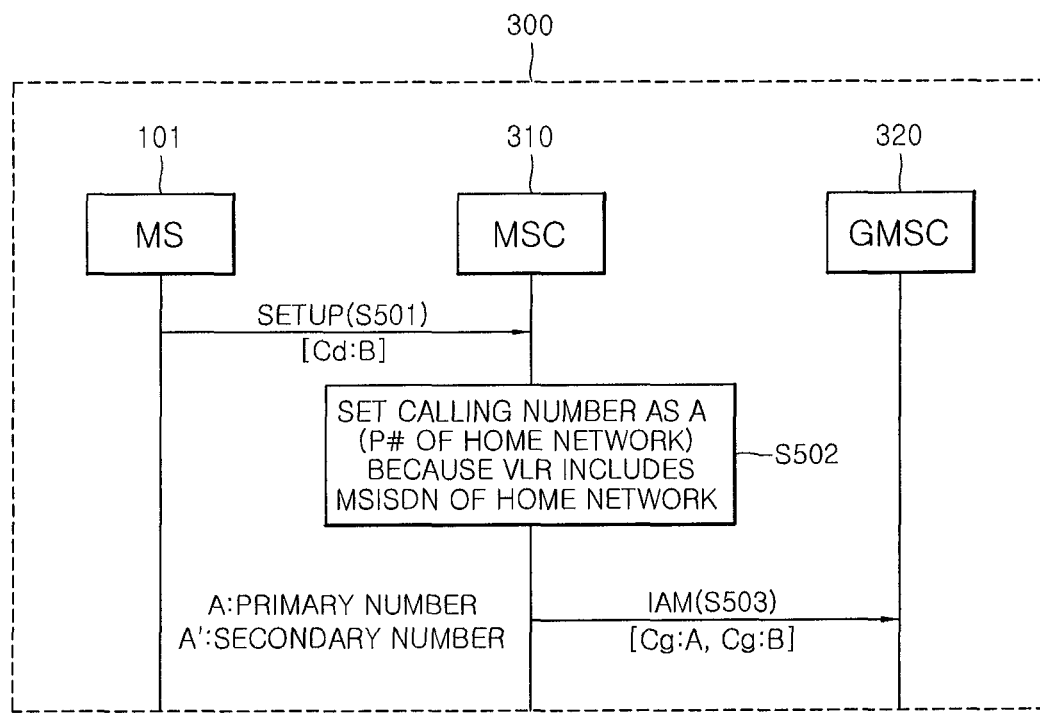
FIG. 6 is a flowchart showing an originating call processing method performed when a call originates using a primary number in a third party network according to the call processing system of the mobile communication terminal of FIG. 1.

FIG. 6 is a flowchart showing an originating call processing method performed when a call originates using a primary number in a third party network according to the call processing system for mobile communication terminals of FIG. 1.

Referring to the drawing, when the MS 101 transmits a call origination signal, in which a called number is B, in the third party network 300 at step S501, the MSC 310 of the third party network 300 sets a calling number as the primary number of the home network 100, that is, A, because a VLR (not shown) includes the MSISDN number of the home network 100 at step S502. Accordingly, the MSC 310 sends an IAM in which a called number is set as B and a calling number is set as A to the GMSC 320 at step S503.

Figure 7:
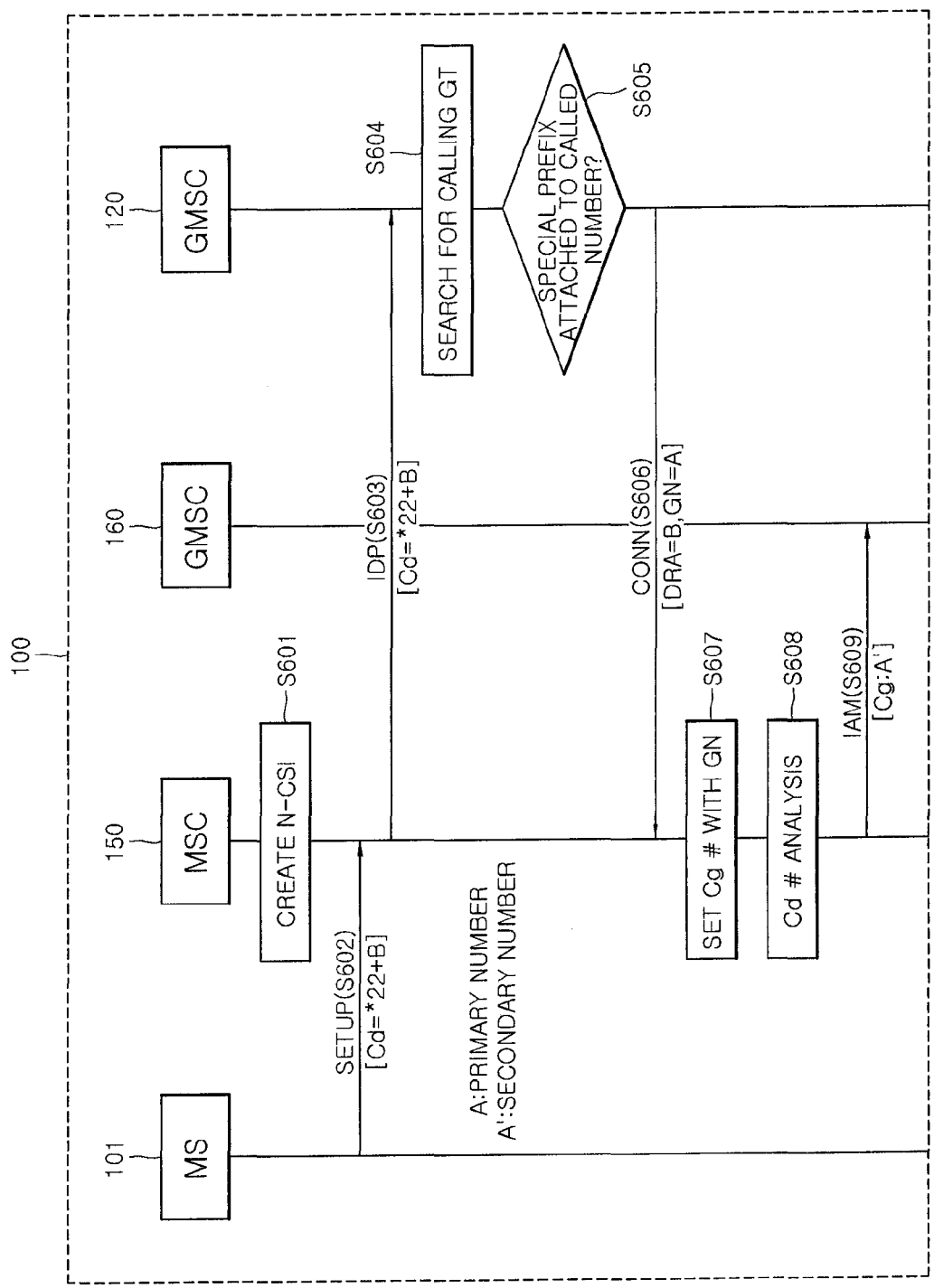
FIG. 7 is a flowchart showing an originating call processing method performed when a call originates using a secondary number in a home network according to the call processing system for the mobile communication terminals of FIG. 1.

FIG. 7 is a flowchart showing an originating call processing method performed when a call originates using a secondary number in a home network according to the call processing system for mobile communication terminals of FIG. 1.

In this case, the MSC 150 of the home network 100 preferably includes a function of generating N-CSI at step S601. The MSC 150 sends an IDP message to the RSCP 120 on the basis of the N-CSI information set in the MSC when the MS 101 sends an originating call in the home network 100 at steps S602 and S603. In the case where the MS 101 originates a call using a secondary number in the home network 100, it is preferable to originate a call with a special prefix attached before a called number so as to distinguish the above case from the case where a call originates using a primary number in the home network 100. In the drawing, an example in which a special prefix '*22' is attached before a called number is shown.

The RSCP 120 of the home network 100 searches for the type of service provider network by checking a calling GT on the basis of the received IDP message at step S604, and determines whether a special prefix is attached to a called number at step S605. The reason for this is that, when the special prefix (additional code) is present, the RSCP 120 must set a number assigned to a CONN signal as a primary number or a secondary number according to an originating service provider network.

When a special prefix is attached before the called number, an MSC GT transmitted through the IDP message is the home network 100, so that the RSCP 120 determines that a call has originated using a secondary number in the home network 100, and sends a corresponding connect (CONN) signal to the MSC 150 at step S606. At this time, the signal transmitted from the RSCP 120 to the MSC 150 may preferably include a signal in which a DRA is set as B (called number) and a GN is set as A' (secondary number).

On the basis of the CONN signal received from the RSCP 120, the MSC 150 sets the calling number of the MS 101 as a GN, that is, the secondary number (A') at step S607, analyzes a called number at step S608, and sends an IAM in which a calling number is A' to the GMSC 160 at step S609.

Figure 8:
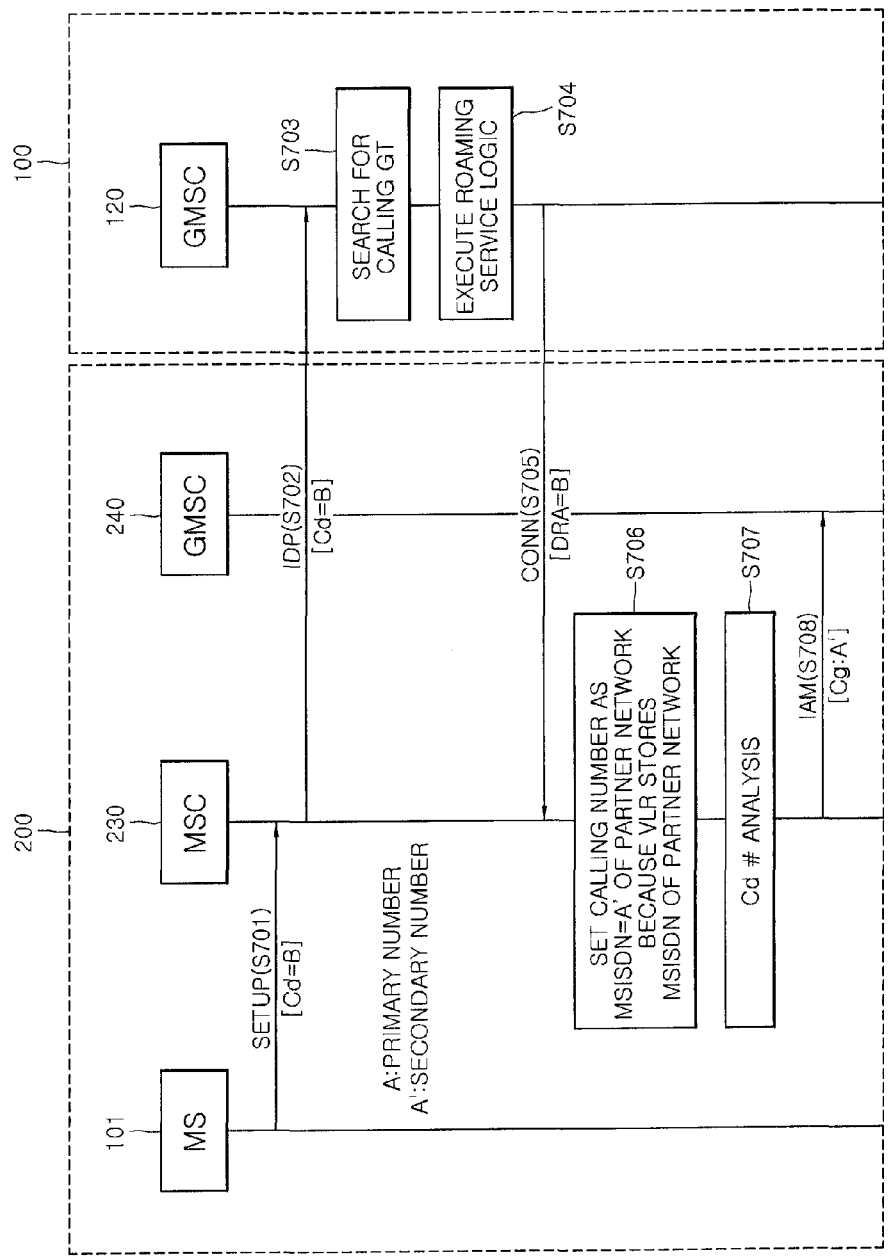
FIG. 8 is a flowchart showing an originating call processing method performed when a call originates using a secondary number in a partner network according to the call processing system for the mobile communication terminals of FIG. 1.

FIG. 8 is a flowchart showing an originating call processing method performed when a call originates using a secondary number in a partner network according to the call processing system for mobile communication terminals of FIG. 1.

When the MS 101 transmits a call origination signal using a secondary number in the partner network 200 at step S701, the MSC 230 of the partner network 200 transmits an IDP message to the RSCP 120 of the home network 100 at step S702. The RSCP 120 of the home network 100 searches for a calling MSC GT on the basis of the IDP message received from the partner network 230 at step S703, executes the logic of roaming service, and sends a CONN signal to the MSC 230 of the partner network 200 at steps S704 and S705. In this case, although a description of the logic of the roaming service has been omitted in FIGS. 4 to 7, it is equally included, and denotes typical logic required to perform international roaming service. At this time, the CONN signal transmitted from the RSCP 120 to the MSC 230 of the partner network 200 preferably includes a signal required to set a DRA as a called number B.

Here, since a VLR (not shown) includes the MSISDN number of the partner network 200 (when location registration is performed in the partner network 200, the MSISDN number of the partner network 200 is included in the ISD and then assigned to the ISD, and thus the VLR of the partner network 200 has a secondary number), the MSC 230 of the partner network 200 sets a calling number as the secondary number A' of the partner network 200 at step S706, analyzes a called number, and sends an IAM in which a calling number is set as A' to the GMSC 240 of the partner network 200 at steps S707 and S708.

Figure 9:
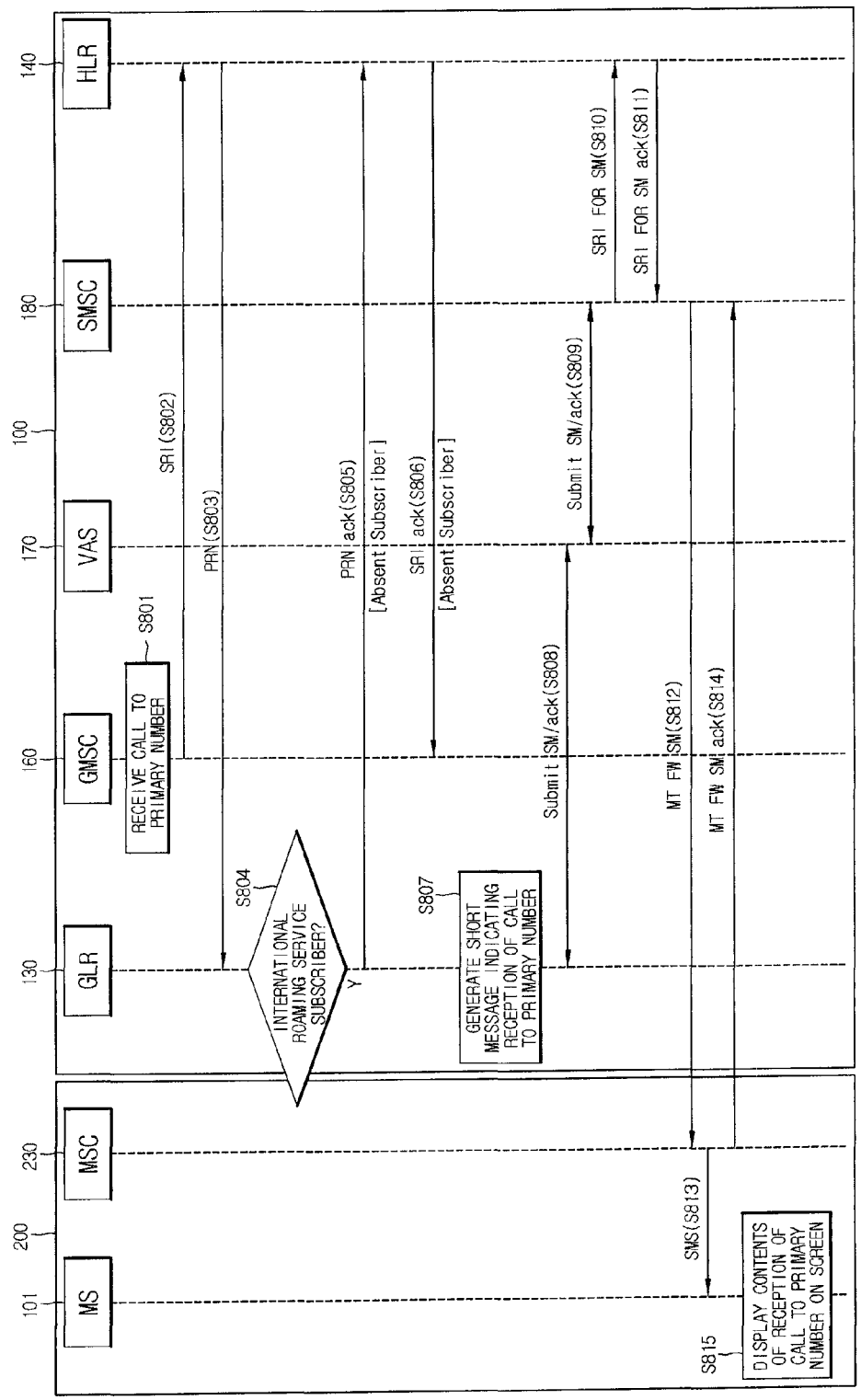
FIG. 9 is a flowchart showing a method of forwarding a short message (SMS) for the reception of a call to an SIMN service subscriber terminal located in a partner network according to the call processing system for the mobile communication terminals of FIG. 1, which shows in detail the case where a call to the primary number of the SIMN service subscriber terminal is received.

FIG. 9 is a flowchart showing a method of forwarding a short message indicating the reception of a call to an SIMN service subscriber terminal located in a partner network according to the call processing system for mobile communication terminals of FIG. 1, which shows in detail the case where a call to the primary number of the SIMN service subscriber terminal is received.

Here, FIG. 9 illustrates the case where setting is performed to receive only a short message if a call to a primary number is received when the SIMN service subscriber is located in a partner network or a third party network at the time of subscribing to international roaming service.

Referring to the drawing, when a call to a primary number is received, the GMSC 160 of the home network 100 sends an SRI signal to the HLR 140, and the HLR 140 sends a PRN signal required to detect the location of the SIMN service subscriber to the GLR 130 at steps S801 to S803.

The GLR 130 determines whether a mobile communication subscriber having the primary number is a subscriber to international roaming service including SIMN service, and sends a PRN ack signal, indicating that call reception is impossible (absent subscriber), to the HLR 140 if it is determined that the mobile communication subscriber is the international roaming service subscriber, and the HLR 140 sends an SRI ack signal, including the absent subscriber, to the GMSC 160 at steps S804 to S806.

Here, the GLR 130 sends a PRN ack signal, including the absent subscriber, to the HLR 140 because the international roaming service subscriber is designated to receive information about call reception only through a short message when the international roaming service subscriber is located in the partner network 200 or the third party network 300 rather than the home network 100, and a call to a primary number is received.

At this time, the GMSC 160 may output a voice signal, indicating that call reception is impossible, to the calling terminal.

Further, although not shown in the drawing, a call reception method based on the result of the determination of whether the mobile communication subscriber has subscribed to the international roaming service and the result of the reception of a call to a primary number may be performed by the RSCP 120, and the results of the performance may be provided to the GLR 130.

The GLR 130 sends a PRN ack signal to the HLR, and thereafter generates a short message indicating that a call to a primary number has been received at step S807.

Further, the GLR 130 sends the generated short message to the SMSC 180 through the transmission/reception of signals (submit SM/ack) to/from the VAS 170 at steps S808 and S809.

The SMSC 180 sends an SRI FOR SM signal to the HLR 140 so as to detect the location of the mobile communication terminal having the primary number, which will receive the short message, and then receives an SRI FOR SM ack signal, including information about the MSC GT of a network, in which the SIMN service subscriber terminal is located, from the HLR 140 at steps S810 and S811.

The SMSC 180 sends a short message forwarding signal (Mobile Termination Forwarding Short Message: MT FW SM) to the MSC 230 of the partner network 200 using the MSC GT information received from the HLR 140, and forwards a short message, indicating that a call to the primary number has been received, to the SIMN service subscriber terminal 101 through the MSC 230 of the partner network 200 at steps S812 and S813.

When the short message is forwarded to the SIMN service subscriber terminal 101, the MSC 230 of the partner network 200 sends an MT FW SM ack signal to the SMSC 180 of the home network 100 at step S814.

The SIMN service subscriber terminal 101 displays on the screen the contents of the short message indicating that the call to the primary number has been received so that the international roaming service subscriber can recognize that the call to the primary number has been received at step S815.

Next, a call processing method performed when a call to the secondary number of a SIMN service subscriber terminal will be described below.

Figure 10:
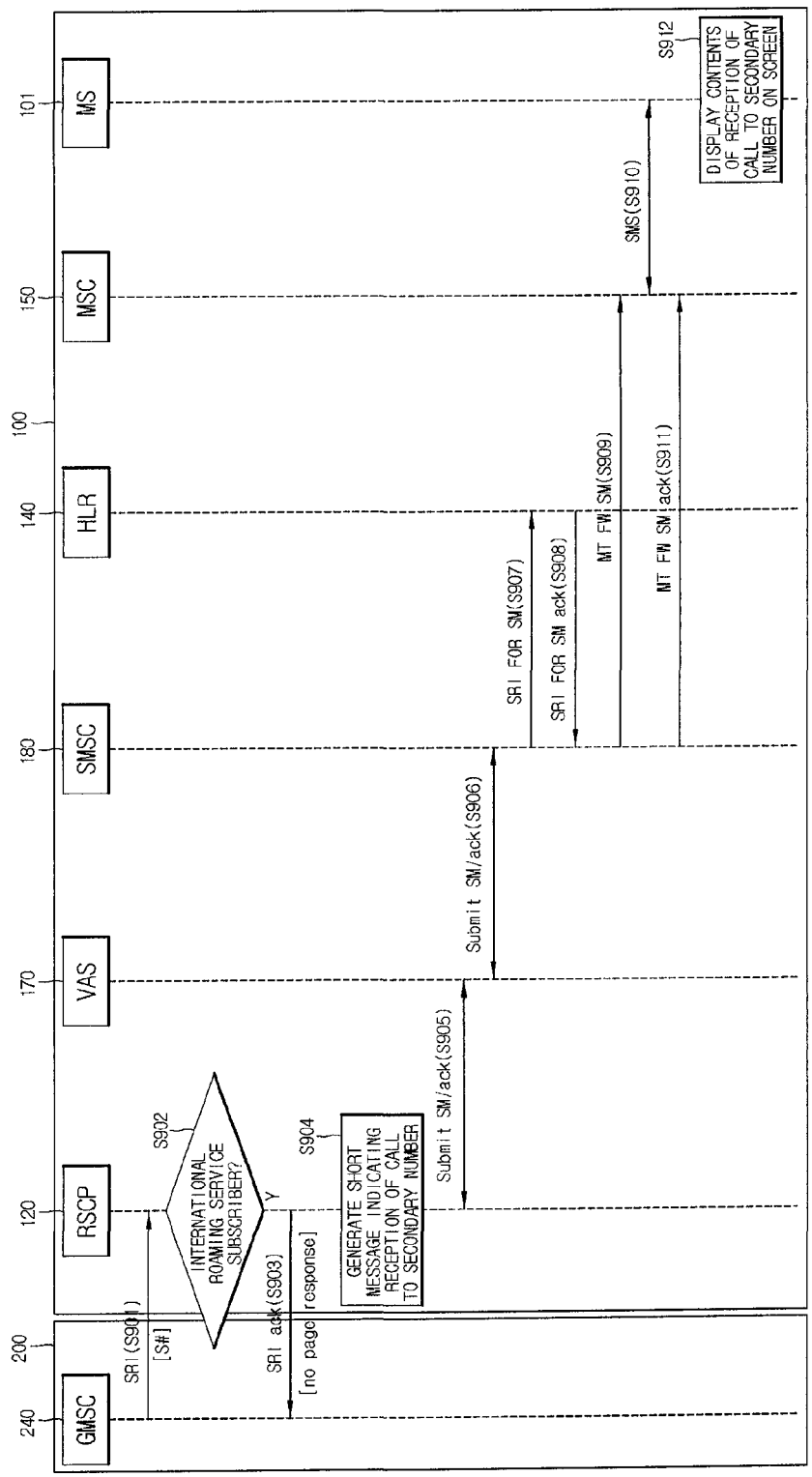
FIG. 10 is a flowchart showing a method of forwarding a short message indicating the reception of a call to an SIMN service subscriber terminal located in a home network according to the call processing system for the mobile communication terminals of FIG. 1, which shows in detail the case where a call to the secondary number of the SIMN service subscriber terminal is received.
Figure 11:
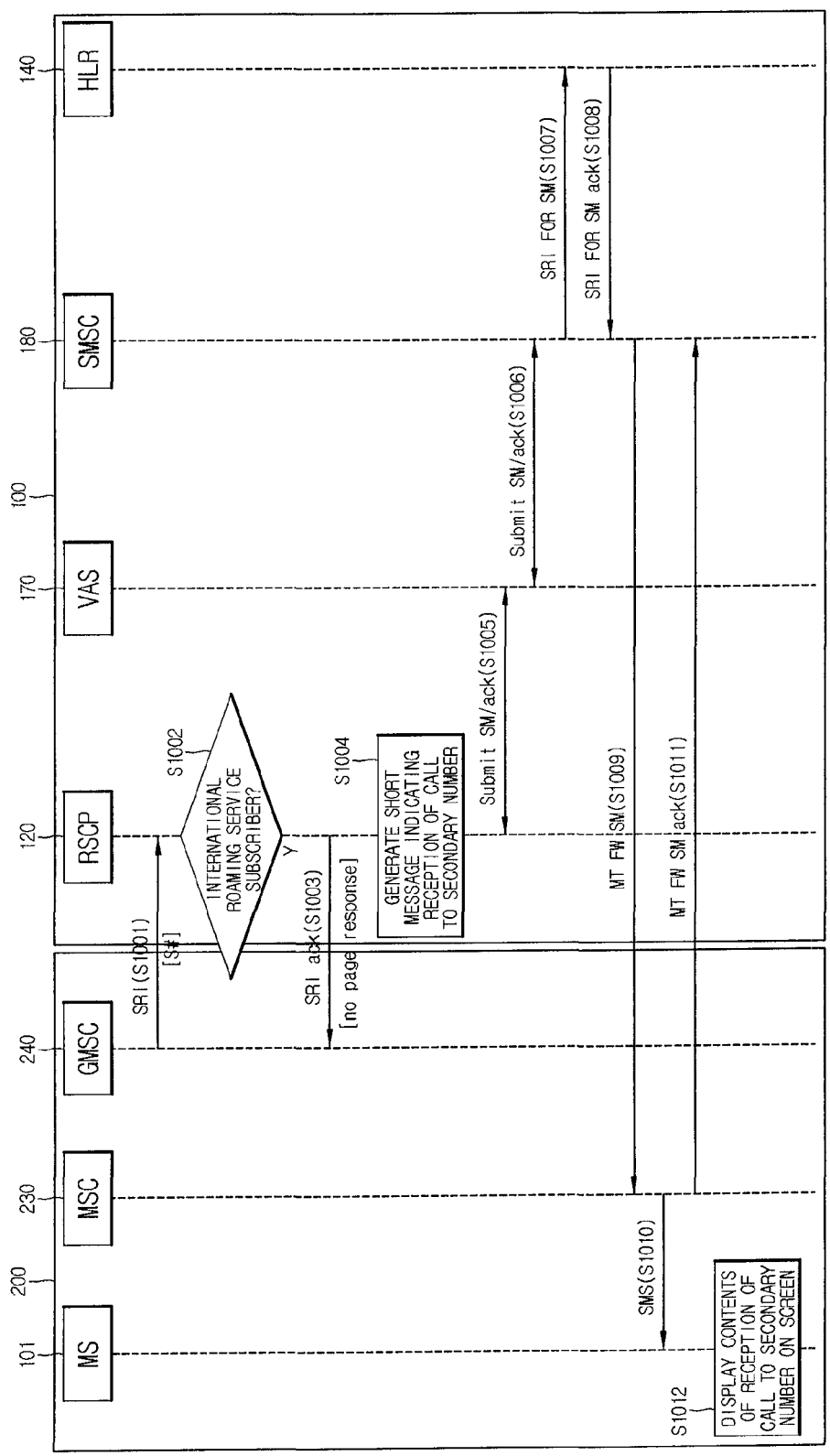
FIG. 11 is a flowchart showing a method of forwarding a short message indicating the reception of a call to an SIMN service subscriber terminal located in a partner network according to the call processing system for the mobile communication terminals of FIG. 1, which shows in detail the case where a call to the secondary number of the SIMN service subscriber terminal is received.
Figure 12:
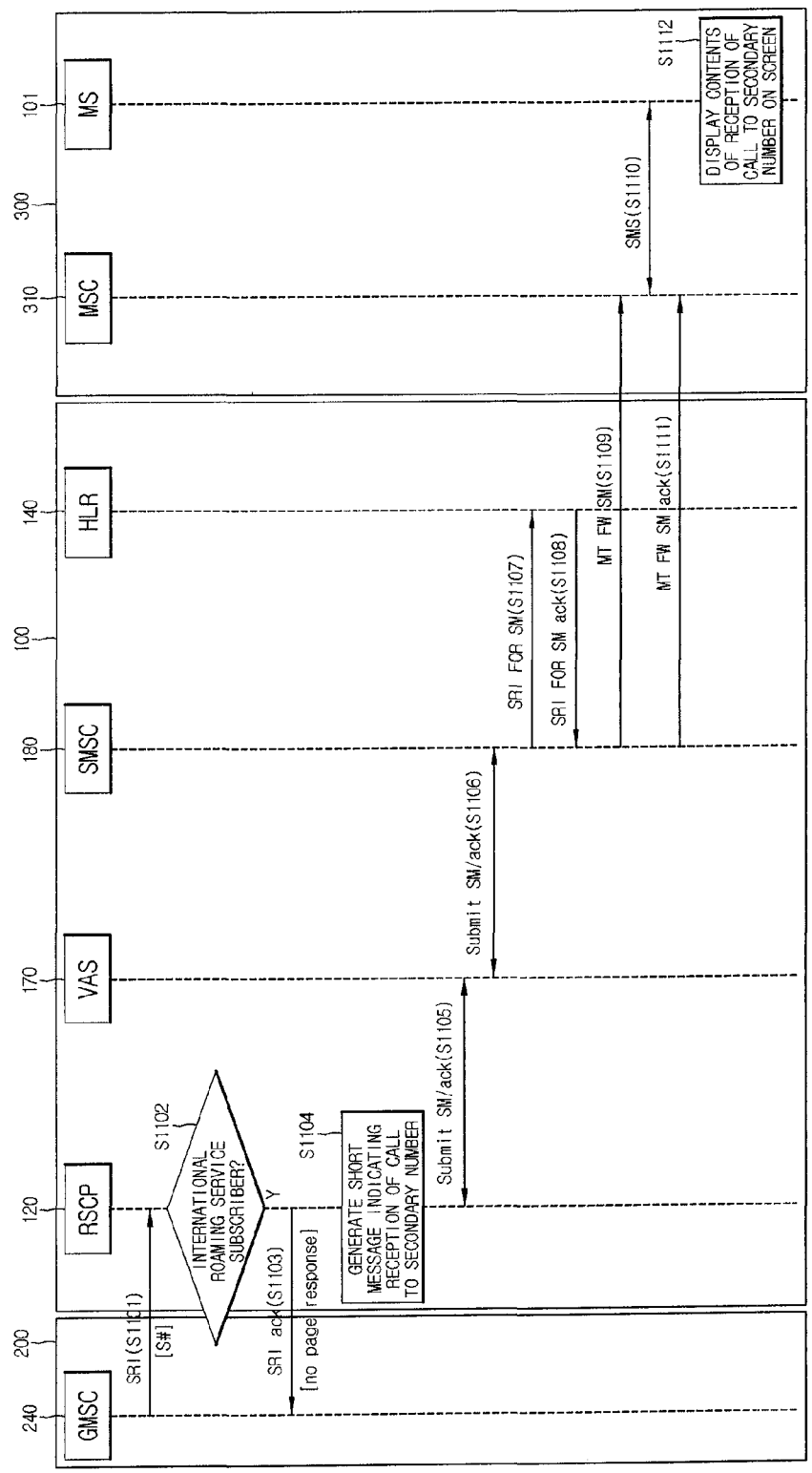
FIG. 12 is a flowchart showing a method of forwarding a short message indicating the reception of a call to an SIMN service subscriber terminal located in a third party network according to the call processing system for the mobile communication terminals of FIG. 1, which shows in detail the case where a call to the secondary number of the SIMN service subscriber terminal is received.

FIGS. 10 to 12 illustrate the case where only a short message is received with respect to the reception of a call to a secondary number, which shows in detail the case where an item for receiving only a short message indicating the reception of a call to a secondary number when a call to a secondary number is received is set by an SIMN service subscriber.

FIG. 10 is a flowchart showing a process for forwarding a short message indicating call reception to the SIMN service subscriber terminal 101 located in the home network 100.

Referring to FIG. 10, when a call to the secondary number (S#) of the SIMN service subscriber terminal 101 is received, the GMSC 240 of the partner network 200 sends an SRI signal, including the secondary number, to the RSCP 120 at step S901.

When the SRI signal is received, the RSCP 120 determines whether a mobile communication subscriber having a secondary number is international roaming service subscriber, that is, an SIMN service subscriber, and transmits an SRI ack signal (no page response), indicating that the reception of a call to a secondary number is impossible, to the GMSC 240 of the partner network 200 so as to perform a process for sending a short message indicating the reception of the call to the secondary number if it is determined that the mobile communication subscriber is the international roaming service subscriber at steps S902 and S903.

The RSCP 120 generates a short message to be sent to the SIMN service subscriber terminal 101, that is, a short message indicating that a call to a secondary number has been received, and sends the generated short message to the SMSC 180 through the transmission/reception of signals (submit SM/ack) to/from the VAS 170 at steps S904 to S906.

The SMSC 180 sends an SRI FOR SM signal to the HLR 140 so as to detect the location of a mobile communication terminal having the secondary number, which will receive the short message, and receives an SRI FOR SM ack signal, including information about the MSC GT of a network in which the SIMN service subscriber terminal 101 is located, from the HLR 140 at steps S907 and S908.

The SMSC 180 sends an MT FW SM signal to the MSC 150 of the home network 100 using the MSC GT information received from the HLR 140, and forwards a short message, indicating that a call to the secondary number has been received, to the SIMN service subscriber terminal 101 through the MSC 150 at steps S909 and S910.

The MSC 150 forwards the short message to the SIMN service subscriber terminal 101 and sends an MT FW SM ack signal to the SMSC 180 at step S911.

The SIMN service subscriber terminal 101 displays on the screen the contents of the short message received from the MSC 150, that is, a short message, indicating that the call to the secondary number has been received so that the international roaming service subscriber can recognize that the call to the secondary number has been received at step S912.

FIG. 11 is a flowchart showing a method of forwarding a short message indicating call reception to an SIMN service subscriber terminal located in a partner network.

In this case, steps S1001 to 1008 of the flowchart of FIG. 11 are identical to steps S901 to S908 of the flowchart of FIG. 10, and thus the operation thereof is described in brief.

Referring to FIG. 11, when a call to the secondary number (S#) of the SIMN service subscriber terminal 101 is received, the GMSC 240 of the partner network 200 sends an SRI signal, including the secondary number, to the RSCP 120 at step S1001. When the SRI signal is received, the RSCP 120 determines whether a mobile communication subscriber having the secondary number is international roaming service subscriber, and sends an SRI ack signal, indicating that the reception of the call to the secondary number is impossible (no page response), to the GMSC 240 of the partner network 200 if it is determined that the mobile communication subscriber is the international roaming service subscriber at steps S1002 and S1003.

The RSCP 120 generates a short message, indicating that the call to the secondary number has been received, and sends the short message to the SMSC 180 through the VAS 170 at steps S1004 to S1006.

The SMSC 180 requests and receives information about the location of the SIMN service subscriber terminal, which will receive the short message, from the HLR 140 at steps S1007 and S1008.

The SMSC 180 sends an MT FW SM signal to the MSC 230 of the partner network 200, and then sends a short message, indicating that the call to the secondary number has been received, to the SIMN service subscriber terminal 101 through the MSC 230 of the partner network 200 at steps S1009 and S1010.

The MSC 230 sends the short message to the SIMM service subscriber terminal 101, and sends an MT FW SM ack signal to the SMSC 180 of the home network 100 at step S1011.

The SIMN service subscriber terminal 101 displays the contents of the short message indicating that the call to the secondary number has been received so that the international roaming service subscriber can recognize that the call to the secondary number has been received at step S1012.

FIG. 12 is a flowchart showing a method of forwarding a short message indicating call reception to an SIMM service subscriber terminal located in a third party network.

Compared to the flowchart of FIG. 11, the flowchart of FIG. 12 differs only in the process for forwarding a short message to the SIMN service subscriber terminal 101 by sending the short message to the MSC 310 of the third party network 300 (steps S1109 to S1111), and thus a description will be made on the basis of steps S1109 to S1111.

That is, step S1101 at which the RSCP 120 receives an SRI signal, including a secondary number (S#), from the GMSC 240 of the partner network 200 to step S1108 at which the SMSC 180 requests and receives the location information of an SIMN service subscriber terminal, which will receive a short message, from the HLR 140 are identical to steps S1001 to S1008 of FIG. 11.

Of course, MSC GT information, which is transmitted from the HLR 140 to the SMSC 180 at step S1108, is information about the MSC GT of the third party network 300, rather than the information about the MSC GT of the partner network 200 of FIG. 11.

When an SRI FOR SM ack signal is received, the SMSC 180 sends an MT FW SM signal to the MSC 310 of the third party network 300, thus forwarding a short message, indicating that a call to the secondary number has been received, to the SIMN service subscriber terminal 101 through the MSC 310 of the third party network 300 at steps S1109 and S1110. The MSC 310 sends a MT FW SM ack signal, which is a response signal to the MT FW SM signal, to the SMSC 180 of the home network 100 at step S1111.

Since step S1112 is identical to step S912 or S1012 of FIG. 10 or 11, a detailed description thereof is omitted here.

Figure 13:
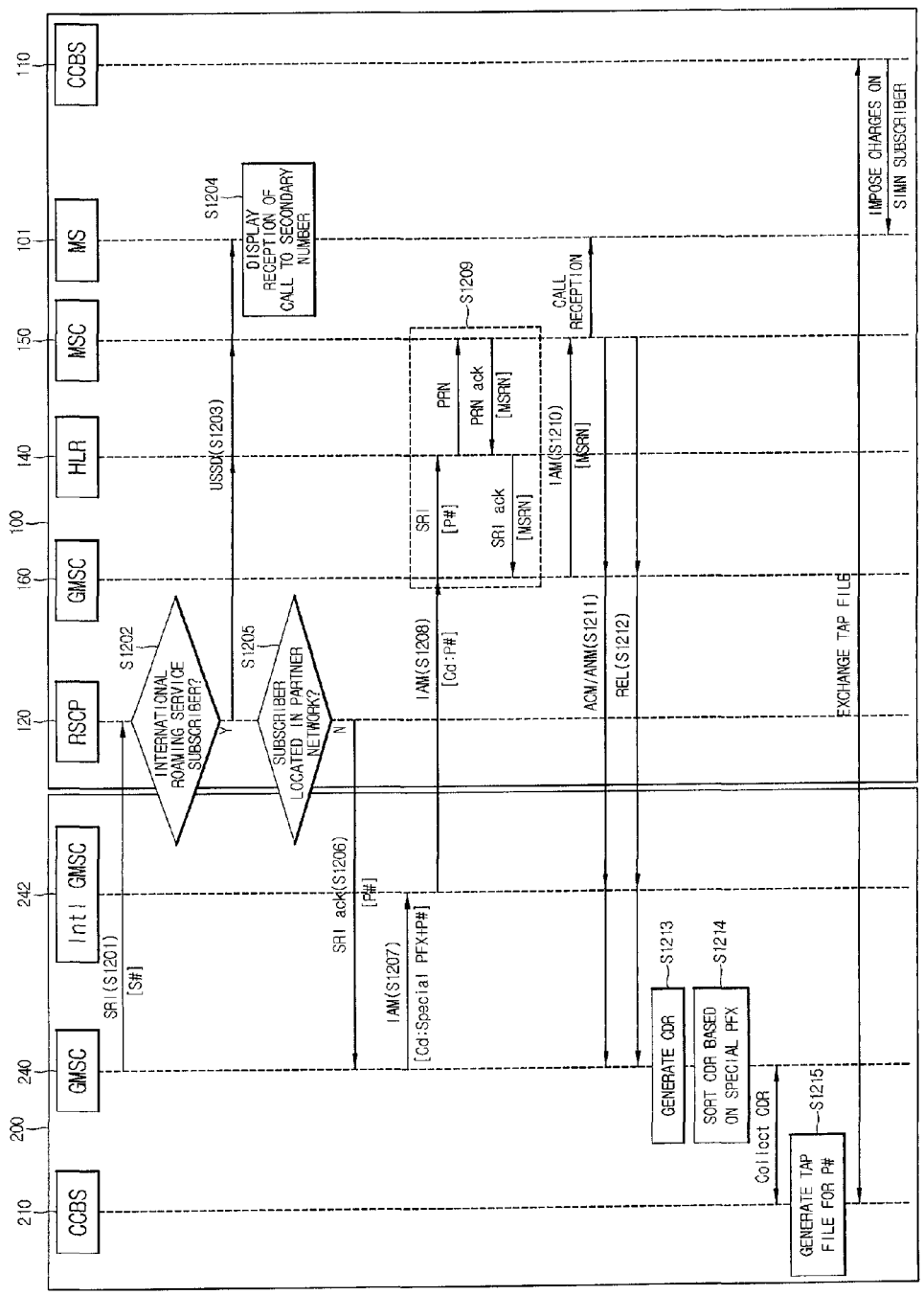
FIG. 13 is a flowchart showing a method of directly connecting an originating call to a secondary number to an SIMN service subscriber terminal located in a home network according to the call processing system for the mobile communication terminals of FIG. 1.
Figure 14:
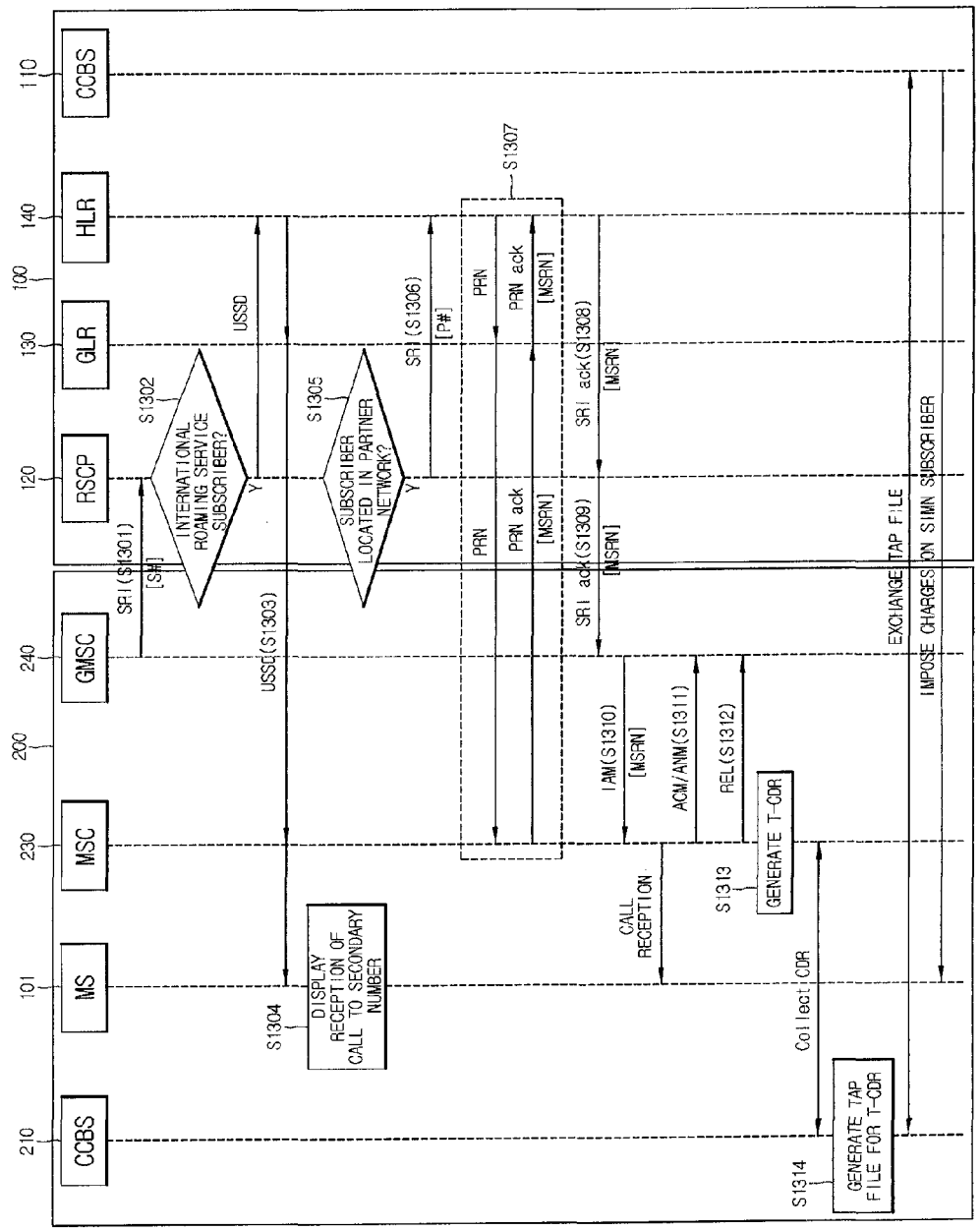
FIG. 14 is a flowchart showing a method of directly connecting an originating call to a secondary number to an SIMN service subscriber terminal located in a partner network according to the call processing system for the mobile communication terminals of FIG. 1.
Figure 15:
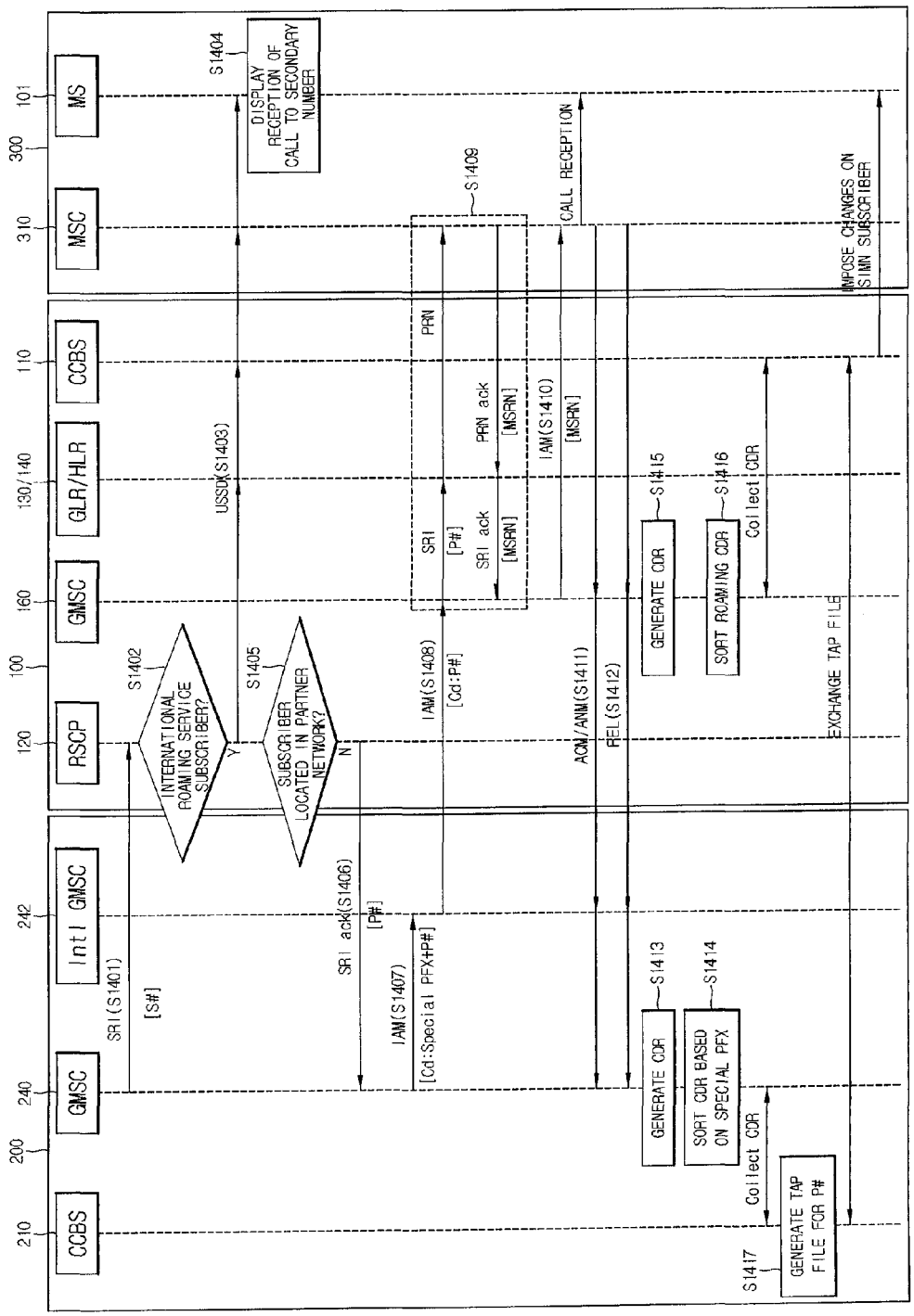
FIG. 15 is a flowchart showing a method of directly connecting an originating call to a secondary number to an SIMN service subscriber terminal located in a third party network according to the call processing system for the mobile communication terminals of FIG. 1.

FIGS. 13 to 15 illustrate the case where a call is directly connected to an SIMN service subscriber terminal with respect to the reception of a call to a secondary number, which shows in detail the case where an item for directly connecting a call when a call to a secondary number is received is set by an SIMN service subscriber.

FIG. 13 is a flowchart showing a method of connecting a call to an SIMN service subscriber terminal located in a home network.

Referring to FIG. 13, when a call to the secondary number (S#) of an SIMN service subscriber terminal 101 is received, the GMSC 240 of the partner network 200 sends an SRI signal, including the secondary number, to the RSCP 120 at step S1201.

When the SRI signal has been received, the RSCP 120 determines whether a mobile communication subscriber having the secondary number is international roaming service subscriber, and sends a USSD message, indicating that a call to the secondary number has been received, to the SIMN service subscriber terminal 101 if it is determined that the mobile communication subscriber is the international roaming service subscriber, thus enabling information, indicating that the call to the secondary number has been received, to be displayed on the screen of the SIMN service subscriber terminal 101 at steps S1202 to S1204.

Of course, it is apparent that the USSD message is transferred to the SIMN service subscriber terminal 101 through the MSC 150 on the basis of the location information of the SIMN service subscriber terminal stored in the HLR.

The RSCP 120 determines whether the SIMN service subscriber terminal is located in the partner network 200 on the basis of the updated location information of the SIMN service subscriber terminal 101 at step S1205. Although not shown in the drawing, the RSCP 120 receives the location-registered SIMN service subscriber information from the GLR 130, and determines the location of the SIMN subscriber terminal on the basis of the received SIMN service subscriber information. That is, when power is applied to the SIMN service subscriber terminal 101, information about the location of the terminal, for example, information related to a network or the like, is updated in the RSCP 120. The RSCP 120 determines whether the SIMN service subscriber is located in the home network 100, the third party network 300 or the partner network 200 on the basis of the updated location information of the SIMN service subscriber terminal.

At this time, when an SRI signal for the secondary number is received, the RSCP 120 sends a primary number HLR Any Time Interrogation (ATI) message to the HLR 140 of the home network 100, and acquires information about the location of the SIMN service subscriber from the HLR 140. Accordingly, the location information of the SIMN service subscriber at which the call to the secondary number is received, is acquired, and thus the location of the SIMN service subscriber can be detected.

Since the SIMN service subscriber is located in the home network 100, the RSCP 120 sends an SRI ack signal, including both previously agreed-upon data (special PFX) and a primary number (P#) corresponding to the secondary number, to the GMSC 240 of the partner network 200 at step S1206.

The GMSC 240 of the partner network 200 sends an IAM signal, in which a called number (Cd) is composed of the data (special PFX) and the primary number (P#) received from the RSCP 120, to an international (Intl) GMSC 242, and the Intl GMSC 242 sends an IAM signal in which a called number (Cd) is set as the primary number (P#) to the GMSC 160 of the home network 100 at steps S1207 and S1208.

As shown in steps S1206 to S1208, the present invention is configured such that the RSCP 120 sends the special prefix (PFX), which is data previously agreed upon with the partner network 200, to the GMSC 240 of the partner network 200. This is required to differentiate billing data generated between the partner network 200 and the home network 100 from billing data generated between the partner network 200 and the third party network 300 when the GMSC 240 of the partner network 200 generates billing data.

The GMSC 160 of the home network 100 sends an SRI signal, including the primary number, to the HLR 140, and the HLR 140 sends a PRN signal, requesting an MSRN, to the relevant MSC 150 on the basis of both the primary number and the previously stored location information of the SIMN service subscriber terminal, receives a PRN ack signal, including the MSRN, from the MSC 150, and sends an SRI ack signal, including the received MSRN, to the GMSC 160 of the home network 100 at step S1209.

The GMSC 160 of the home network 100 sends an IAM signal to the MSC 150 corresponding to the MSRN on the basis of the MSRN included in the SRI ack signal, thus enabling the call to the secondary number to be received at the SIMN service subscriber terminal 101 through the MSC 150 at step S1210.

When the call is connected through the reception of the call by the SIMN service subscriber, call connection information ACM/ANM is transferred to the GMSC 240 of the partner network 200 via the MSC 150 of the home network 100, the GMSC 160 of the home network 100 and the Intl GMSC 242 of the partner network 200. Similarly, when the call is terminated through a call termination operation performed by the SIMN service subscriber, call termination information REL is transferred to the GMSC 240 of the partner network 200 via the MSC 150 of the home network 100, the GMSC 160 of the home network 100 and the Intl GMSC 242 of the partner network 200 at steps S1211 and S1212.

The GMSC 240 of the partner network 200 generates billing data (CDR: call data records) of respective SIMN service subscriber terminals, and sorts out billing data, having special PFX received from the RSCP 120, from the generated billing data at steps S1213 and S1214.

That is, the GMSC 240 of the partner network 200 sorts out only the billing data of the SIMN service subscriber terminal generated between the partner network 200 and the home network 100 using the special PFX received from the RSCP 120, the call connection information and the call termination information.

The CCBS 210 of the partner network 200 generates a Transferred Account Procedure (TAP) file for primary numbers by collecting billing data, and exchanges the TAP file with the CCBS 110 of the home network at step S1215.

The CCBS 110 of the home network 100 imposes charges, generated between the partner network 200 and the home network 100, on the SIMN service subscriber using the TAP file.

At this time, in order to include the IMSI of a called subscriber in the TAP file, the CCBS 110 may manage mapping between primary number/secondary number, may find the IMSI of the SIMN terminal subscriber using both the special PFX and the primary number information, which are transmitted through an SRI ack signal, and may insert the IMSI into the TAP file.

FIG. 14 is a flowchart showing a method of connecting a call to an SIMN service subscriber terminal located in a partner network.

Referring to FIG. 14, when a call to the secondary number (S#) of an SIMN service subscriber terminal 101 is received, the GMSC 240 of the partner network 200 sends an SRI signal, including the secondary number, to the RSCP 120 at step S1301.

When the SRI signal is received, the RSCP 120 determines whether a mobile communication subscriber having the secondary number is international roaming service subscriber, and sends a USSD message, indicating that the call to the secondary number has been received, to the SIMN service subscriber terminal if it is determined that the mobile communication subscriber is the international roaming service subscriber, thus enabling information, indicating that the call to the secondary number has been received, to be displayed on the screen of the SIMN service subscriber terminal at steps S1302 to S1304.

In this case, since the HLR 140 knows that the SIMM service subscriber terminal 101 is located in the partner network 200 on the basis of the location information of the SIMN service subscriber terminal, the HLR 140 sends a USSD message to the GLR 130, and the GLR 130 transfers the USSD message to the SIMN service subscriber terminal 101 through the MSC 230 of the partner network 200.

The RSCP 120 determines whether the SIMN service subscriber is located in the partner network 200. In this case, since the SIMN service subscriber is located in the partner network, the RSCP 120 sends an SRI signal, including a primary number, to the HLR 140 at steps S1305 and S1306.

The HLR 140 sends a PRN signal, requesting an MSRN, to the MSC 230 of the partner network 200 through the GLR 130 on the basis of the primary number included in the SRI signal and the location information of the SIMN service subscriber terminal corresponding to the primary number, and receives a PRN ack signal, including the MSRN, from the MSC 230 of the partner network 200 through the GLR 130 at step S1307.

The HLR 140 sends an SRI ack signal, including the MSRN of the MSC 230 in which the SIMN service subscriber terminal is located, to the RSCP 120 as a response signal to the SRI signal received from the RSCP 120, and the RSCP 120 sends an SRI ack signal, including the MSRN received from the HLR 140, to the GMSC 240 of the partner network 200 as a response signal to the SRI signal received from the GMSC 240 of the partner network 200 at steps S1308 and S1309.

The GMSC 240 of the partner network 200 sends an IAM signal to the MSC 230 corresponding to the MSRN included in the SRI ack signal, thus enabling the call to the secondary number to be received at the SIMN service subscriber terminal 101 through the MSC 230 at step S1310.

When a call is connected through the call reception operation performed by the SIMN service subscriber, the MSC 230 transfers call connection information ACM/ANM to the GMSC 240, transfers call termination information REL to the GMSC 240 when the call is terminated, and generates Termination CDR (T-CDR) at steps S1311 to S1313.

The CCBS 210 generates a TAP file for the T-CDR by collecting billing data generated by the MSC 230, and then exchanges the TAP file with the CCBS 110 of the home network 100 at step S1314.

The CCBS 110 of the home network 100 imposes charges, generated due to the reception of the call to the secondary number, on the SIMN service subscriber using the TAP file.

FIG. 15 is a flowchart showing a method of connecting a call to an SIMN service subscriber terminal located in a third party network.

Referring to FIG. 15, steps S1401 to S1408 are identical to steps S1201 to S1208 of FIG. 13, and thus a description thereof is omitted here. Of course, step S1403 at which a USSD message is transferred to the SIMN service subscriber terminal 101 through the MSC 310 of the third party network 300 is different from step S1203 of FIG. 13.

When an IAM signal is received at step S1408, the GMSC 160 of the home network 100 sends an SRI signal, including a primary number, to the HLR 140, and the HLR 140 sends a PRN signal, requesting an MSRN, to the MSC 310 of the third party network 300 through the GLR 160 using the location information of the SIMN service subscriber terminal having the primary number, receives a PRN ack signal, including the MSRN, from the MSC 310 of the third party network 300 through the GLR 130, and sends an SRI ack signal, including the MSRN corresponding to the MSC 310 of the third party network 300, to the GMSC 160 at step S1409.

The GMSC 160 of the home network 100 sends an IAM signal to the MSC 310 of the third party network 300 on the basis of the MSRN included in the SRI ack signal, thus enabling the call to the secondary number to be received at the SIMN service subscriber terminal 101 through the MSC 310 of the third party network 300 at step S1410.

Steps S1411 to S1414 are identical to steps S1211 to S1214 of FIG. 13, and thus a description thereof is omitted.

The GMSC 160 of the home network 100 generates billing data of communication terminals, sorts out roaming billing data generated between the home network 100 and the third party network 300 from the generated billing data at steps S1415 and S1416. That is, the GMSC 160 of the home network 100 generates billing data attributable to the use of international lines between the home network 100 and the third party network 300 from the billing data generated when a call to the secondary number of the SIMN service subscriber terminal 101 located in the third party network 300 is received.

Step S1417 is identical to step S1215 of FIG. 13, and thus a description thereof is omitted here.

The CCBS 110 of the home network 100 imposes charges, generated due to international roaming service, on the SIMN service subscriber located in the third party network 300 using both the TAP file received from the CCBS 210 of the partner network 200 and the billing data received from the GMSC 160 of the home network 100.

Figure 16:
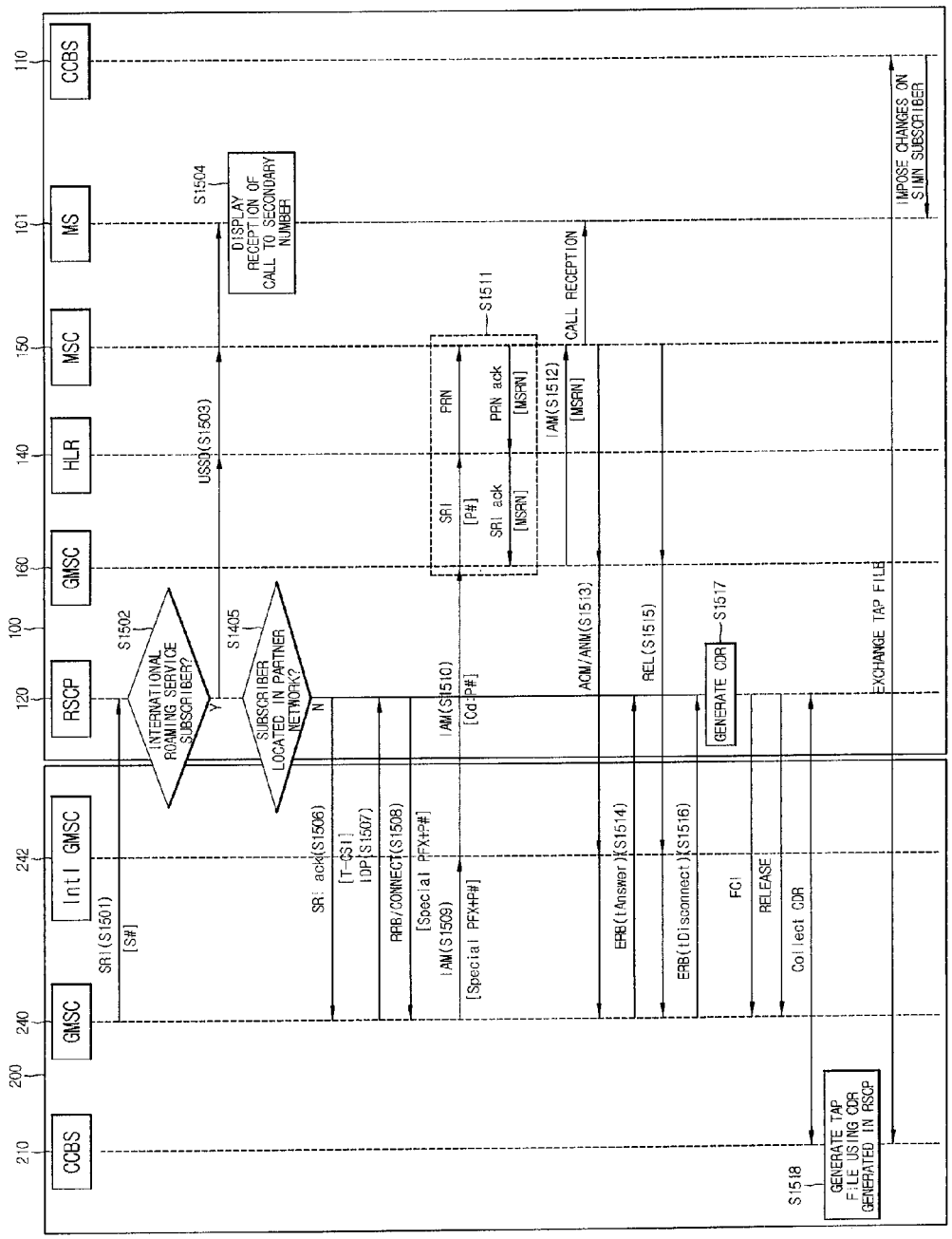
FIG. 16 is a flowchart showing another embodiment of a method of connecting a call to an SIMN service subscriber terminal located in a home network, which shows in detail a method of generating billing data occurring between the home network and a partner network in the home network.

FIG. 16 is a flowchart showing another embodiment of a method of connecting a call to an SIMN service subscriber terminal located in a home network, which shows in detail a method of generating billing data between a home network and a partner network in the home network.

Referring to FIG. 16, steps S1501 to S1505 are identical to steps S1201 to S1205 of FIG. 13, and thus a detailed description thereof is omitted here.

As a result of the determination at step S1505, since the SIMN service subscriber terminal is located in the home network 100, the RSCP 120 sends an SRI ack signal, including TCSI, to the GMSC 240 of the partner network 200, and the GMSC 240 of the partner network 200 sends an IDP signal to the RSCP 120 using TCSI information included in the SRI ack signal. When the IDP signal is received, the RSCP 120 sends an RRB/CONNECT signal, in which event notification conditions, for example, call connection and call termination conditions, are set in RequestReportBCSM (RRB) and in which both previously agreed-upon data (special PFX) and the primary number are included in CONNECT, to the GMSC 240 of the partner network 200 by driving the logic of the SIMN service at steps S1506 to S1508.

When the GMSC 240 of the partner network 200 receives the RRB/CONNECT signal from the RSCP 120, the GMSC 240 analyzes a called number with reference to a Destination Routing Address (DRA) included in the CONNECT, and initiates a call. Step S1509 at which an IAM signal is sent to the Intl GMSC 242 to step S1512 at which the SIMN service subscriber terminal 101 located in the home network 100 receives a call through the MSC 150 of the home network 100 are identical to steps S1207 to S1210 of FIG. 13, and thus a description thereof is omitted.

At step S1512, when the SIMN service subscriber terminal 101 receives a call to the secondary number and connects the call through the operation of the SIMN service subscriber, the MSC 150 sends call connection information ACM/ANM to the GMSC 240 of the partner network 200 through both the GMSC 160 of the home network 100 and the Intl GMSC 242 of the partner network 200, and the GMSC 240 of the partner network 200 sends information ERB (tAnswer) corresponding to call connection to the RSCP 120 so that the RSCP 120 can generate CDR at steps S1513 and S1514.

Similarly, when the call is released through the operation of the SIMN service subscriber, the MSC 150 sends call termination information REL to the GMSC 240 of the partner network 200 through both the GMSC 160 of the home network 100 and the Intl GMSC 242 of the partner network 200, and the GMSC 240 of the partner network 200 sends information ERB (tDisconnect) corresponding to call termination to the RSCP 120 at steps S1515 and S1516.

The RSCP 120 generates billing data (CDR) of the SIMN service subscriber terminal between the home network 100 and the partner network 200 on the basis of the two pieces of information, received at steps S1514 and S1516, at step S1517, and sends a Furnish Charging Information (FCI) signal and a RELEASE call signal to the GMSC 240 of the partner network 200.

Here, the FCI signal includes various types of information such as a number used for billing and the type of service which can be arbitrarily set and used by a service provider.

The CCBS 210 of the partner network 200 generates a TAP file by collecting the billing data (CDR) generated by the RSCP 120 at step S1518, and exchanges the TAP file with the CCBS 110 of the home network 100.

At this time, since the RSCP 120 manages all of the primary number/secondary number/IMSI information, the IMSI of the primary number may be stored in the CDR.

The CCBS 110 of the home network 100 imposes charges, generated between the partner network 200 and the home network 100, on the SIMN service subscriber using the TAP file.

Figure 17:
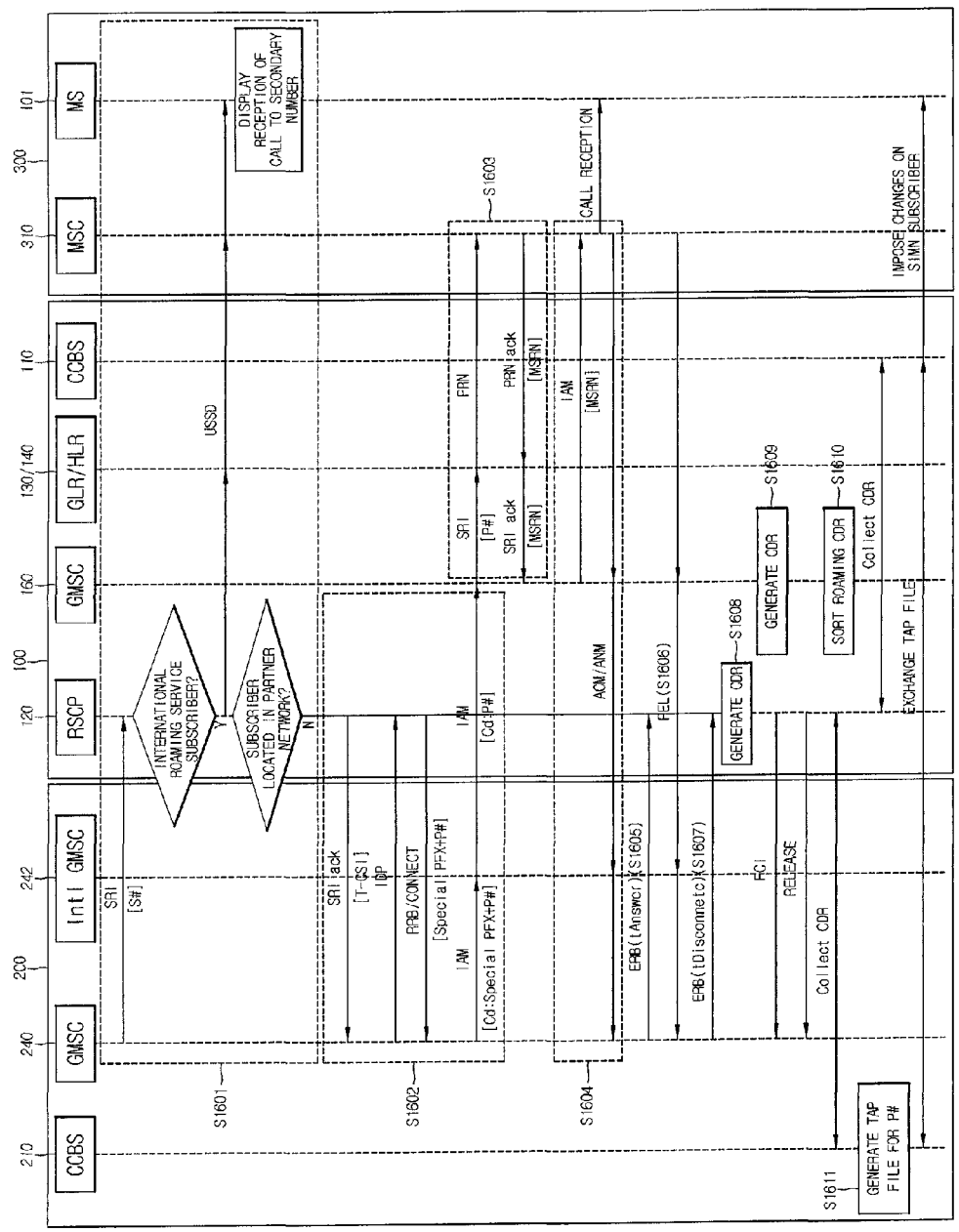
FIG. 17 is a flowchart showing a further embodiment of a method of connecting a call to an SIMN service subscriber terminal located in a third party network, which shows in detail a method of generating billing data occurring between a home network and a partner network in the home network.

FIG. 17 is a flowchart showing a further embodiment of a method of connecting a call to an SIMN service subscriber terminal located in a third party network, which shows in detail a method of generating billing data between a home network and a partner network in the home network.

Referring to FIG. 17, step S1601 is identical to steps S1401 to S1405 of FIG. 15, and thus a detailed description thereof is omitted.

Step S1602 is identical to steps S1506 to S1510 of FIG. 16. That is, at step S1601, since the SIMN service subscriber terminal 101 is located in the third party network 300, the RSCP 120 sends an SRI ack signal, including TCSI, to the GMSC 240 of the partner network 200. When the RSCP 120 receives an IDP signal from the GMSC 240 of the partner network 200, the RSCP 240 sends an RRB/CONNECT signal, including a special PFX and a primary number, to the GMSC 240 of the partner network 200. The GMSC 240 of the partner network 200 receives the RRB/CONNECT signal from the RSCP 120, and sends an IAM signal to the GMSC 160 of the home network 100 through the Intl GMSC 242.

Further, steps S1603 and S1604 are similar to steps S1511 to S1513 of FIG. 15. That is, the GMSC 160 of the home network 100 sends an SRI signal, including the primary number, to the HLR 140, and the HLR 140 sends a PRN signal to the MSC 310 of the third party network 300 through the GLR 130, receives a PRN ack signal, including an MSRN, from the MSC 310 of the third party network 300 through the GLR 130, and sends an SRI ack signal, including the MSRN, to the GMSC 160 at step S1603. Further, the GMSC 160 of the home network 100 sends an IAM signal to the MSC 310 of the third party network 300 on the basis of the MSRN included in the SRI ack signal, enables a call to a secondary number to be received at the SIMN service subscriber terminal 101 through the MSC 310 of the third party network 300, and sends call start time information ACM/ANM to the GMSC 240 of the partner network 200 when the call is connected through the operation of the SIMN service subscriber at step S1604.

When the call connection information ACM/ANM is received at step S1604, the GMSC 240 of the partner network 200 sends ERB (tAnswer) information corresponding to call connection to the RSCP 120 at step S1605. When the call is released and call termination information REL transmitted from the MSC 310 of the third party network 300 is received through the GMSC 160 of the home network 100 and the Intl GMSC 242 of the partner network 200 at step S1606, the GMSC 240 sends information ERB (tDisconnect) corresponding to call termination to the RSCP 120 at step S1607.

Similar to step S1517 of FIG. 16, the RSCP 120 generates billing data (CDR) of the SIMN service subscriber terminal between the home network 100 and the partner network 200 on the basis of the ERB (tAnswer) and the ERB (tDisconnect) at step S1608, and sends both an FCI signal and a RELEASE call signal to the GMSC 240 of the partner network 200.

Steps S1609 and S1610 are identical to steps S1415 and S1416 of FIG. 15, and thus a description thereof is made in brief. That is, the GMSC 160 of the home network 100 generates billing data of communication terminals, and sorts out roaming billing data generated between the home network 100 and the third party network 300 from the generated billing data at steps S1609 and S1610.

Step 1611 is identical to step S1417 of FIG. 15, and thus a description thereof is omitted here.

In FIGS. 13 to 17 as described above, the construction, in which the USSD message is sent to the SIMN service subscriber terminal so that the SIMN service subscriber can recognize that a call to the secondary number has been received, is described. However, a method of notifying the SIMN service subscriber that a call to a secondary number has been received can be implemented using methods other than the method using the USSD message. An example of this method will be described with reference to FIG. 18.

Figure 18:
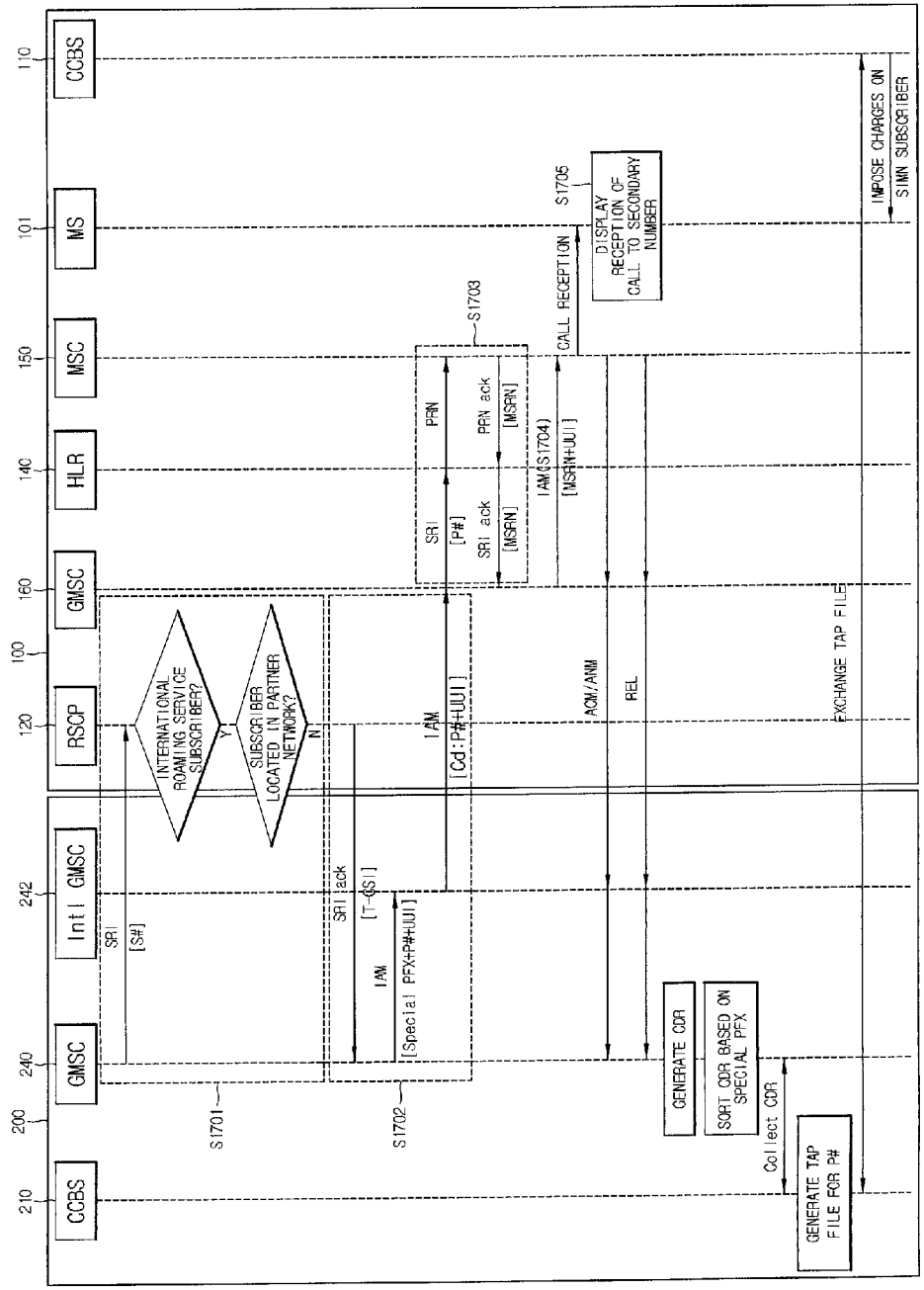
FIG. 18 is a method showing yet another embodiment of a method of connecting a call to an SIMN service subscriber terminal located in a home network, which shows in detail a method of providing notification of the reception of a call to a secondary number using a UUI field.

FIG. 18 is a flowchart showing yet another method of connecting a call to an SIMN service subscriber terminal located in a home network, wherein a User to User Information (UUI) field is used to notify the SIMN service subscriber of the reception of a call to a secondary number.

Compared to FIG. 13, the entire process of FIG. 18 related to the reception of a call to a secondary number is similar, but is configured to notify the SIMN service subscriber of the reception of a call to a secondary number using text indicating the reception of a call to a secondary number stored in the UUI field, without notifying the SIMN service subscriber of the call reception using a USSD message.

In this way, since the operation of FIG. 18 is similar to that of FIG. 13, it will be described on the basis of the content related to a UUI field.

When an SRI signal including a secondary number is received, the RSCP 120 determines whether a mobile communication subscriber having the secondary number is international roaming service subscriber, and determines whether the SIMN service subscriber is located in the partner network 200 on the basis of updated location information of the SIMN service subscriber terminal if it is determined that the mobile communication subscriber is the international roaming service subscriber at step S1701.

Since the SIMN service subscriber is located in the home network 100, the RSCP 120 sends an SRI ack signal, including previously agreed-upon data (special PFX), a primary number (P#) corresponding to the secondary number, and a UUI field in which text indicating the reception of a call to the secondary number is stored, to the GMSC 240 of the partner network 200, and the GMSC 240 of the partner network 200 sends an IAM signal, including the contents of the UUI field, to the GMSC 160 of the home network 100 so as to transmit information about the reception of the call to the secondary number to the SIMM service subscriber terminal 101 at step S1702.

When the MSRN information of the MSC 150 in which the SIMN service subscriber terminal is located is received at step S1703, the GMSC 160 of the home network 100 sends an IAM signal, including the UUI field in which text indicating the reception of the call to the secondary number is stored, to the MSC 150, thus enabling the call to the secondary number to be received at the SIMM service subscriber terminal 101 through the MSC 150 at steps S1703 and S1704.

In this case, the SIMN service subscriber terminal 101 displays contents stored in the UUI field, that is, contents indicating that the call to the secondary number has been received, on the screen at the time of receiving the call at step S1705.

The process after step S1705 is identical to steps S1211 to S1215 of FIG. 13, and thus a description thereof is omitted.

As described above, the call reception method according to the present invention is configured to include text, corresponding to a call to a secondary number, in a UUI field and transmit the resulting UUI field to the SIMM service subscriber terminal, thus allowing the SIMM service subscriber to recognize the reception of a call to the secondary number.

Of course, it is apparent to those skilled in the art that the method of providing notification of the reception of a call to a secondary number using a UUI field can be applied to FIGS. 14 to 17, as well as to FIG. 13.

Although the preferred embodiments of the present invention have been disclosed for illustrative purposes, those skilled in the art will appreciate that the present invention is not limited to the above embodiments and various modifications and changes are possible, without departing from the scope and spirit of the invention as disclosed in the accompanying claims, and such a change belongs to the scope of the claims.

The invention claimed is:

1. A call processing system for mobile communication terminals, comprising:
a gateway location register configured to generate a Database (DB) for international roaming service subscriber; and
a roaming control unit configured to register a location of a mobile communication terminal, to determine whether a call originates using a primary number (primary No.) or a secondary number (secondary No.) in the international roaming service on a basis of originating service provider information and a called number, included in a call origination signal from the mobile communication terminal, and to send a signal corresponding to a result of the determination to a mobile switching center of a network in which the mobile communication terminal is located,
wherein the international roaming service assigns the primary number in a home network and assigns the secondary number in a partner network; and
wherein when the mobile communication terminal is located in the partner network:
the gateway location register acquires a subscriber profile from a home location register in response to a location registration request signal received from the partner network and transmitting the subscriber profile to the partner network;
the gateway location register receives an ack message from the partner network; and
the roaming control unit updates the location information of the subscriber on a basis of the ack message received from the partner network.

2. The call processing system according to claim 1, wherein the mobile communication terminal originates a call by attaching a special prefix to a called number when originating a call using a number of some other network.

3. The call processing system according to claim 1, wherein the mobile switching center includes a Mobile Subscriber Integrated Service Digital Network (MSISDN) number for the mobile communication terminal's own network, and sets a calling number as the MSISDN number of its own network with respect to an originating call from the mobile communication terminal.

4. A call processing system for mobile communication terminals for providing international roaming service using a primary number assigned by a home network and a secondary number assigned by a partner network, comprising:
- a roaming control unit configured to determine whether a mobile communication subscriber has subscribed to the international roaming service when a call to the secondary number is received from a gateway mobile switching center of the partner network, and to generate a text message indicating reception of the call to the secondary number if it is determined that the mobile communication subscriber has subscribed to the international roaming service;
- a location register configured to provide information about a location of a terminal of the mobile communication subscriber on a basis of the primary number corresponding to the secondary number; and
- a message sending unit configured to send the text message received from the roaming control unit to the mobile communication subscriber terminal on a basis of the location information of the mobile communication subscriber terminal received from the location register,
- wherein the roaming control unit determines whether the mobile communication subscriber has subscribed to the international roaming service when the roaming control unit of the home network receives a Send Routing Information (SRI) signal for the secondary number from a gateway mobile switching center of the partner network.

5. A call processing system for mobile communication terminals for providing international roaming service using a primary number assigned by a home network and a secondary number assigned by a partner network, comprising:
- a roaming control unit configured to determine whether a mobile communication subscriber has subscribed to the international roaming service when a call to the secondary number is received from a gateway mobile switching center of the partner network;
- a location register configured to determine a location of a terminal of the mobile communication subscriber on a basis of the primary number corresponding to the secondary number if it is determined by the roaming control unit that the mobile communication subscriber has subscribed to the international roaming service, and to request and to receive a mobile station roaming number from a mobile switching center of a network in which the mobile communication subscriber terminal, the location of which is determined, is located; and
- a gateway mobile switching center configured to receive the mobile station roaming number transmitted from the location register and to provide reception of the call to the secondary number to the mobile communication subscriber terminal on a basis of the received mobile station roaming number,
- wherein the roaming control unit determines whether the mobile communication subscriber has subscribed to the international roaming service when the roaming control unit of the home network receives a Send Routing Information (SRI) signal for the secondary number from a gateway mobile switching center of the partner network.

6. The call processing system according to claim 5, wherein:
- when the mobile communication subscriber terminal has subscribed to the international roaming service, the roaming control unit determines whether the mobile communication subscriber terminal is located in the home network or the third party network, and transmits information, including both previously agreed-upon data and the primary number, to the gateway mobile switching center of the partner network if it is determined that the mobile communication subscriber terminal is located in the home network or the third party network, and
- the location register receives information about the primary number corresponding to the secondary number from the gateway mobile switching center of the home network which receives an Initial Address Message (IAM), including the primary number, transmitted from the gateway mobile switching center of the partner network.

7. A call processing method for mobile communication terminals, comprising the steps of:
- exchanging a database for an international roaming service subscriber with respect to international roaming service for assigning a primary number in a home network and assigning a secondary number in a partner network;
- determining whether a mobile communication terminal has subscribed to the international roaming service and registering a current location of the mobile communication terminal;
- determining whether a call originates using the primary number or the secondary number in the international roaming service on a basis of originating service provider information and a called number received from the mobile communication terminal, and transmitting a signal corresponding to a result of the determination to a mobile switching center of a network in which the mobile communication terminal is located;
- when the mobile communication terminal is located in the partner network, the gateway location register acquiring a subscriber profile from a home location register in response to a location registration request signal received from the partner network and transmitting the subscriber profile to the partner network; and
- the gateway location register receiving an ack message from the partner network,
- wherein the roaming control unit updates the location information of the subscriber on a basis of the ack message received from the partner network.

8. The call processing method according to claim 7, wherein the exchanged database includes a range of MSISDN band of the home network of the international roaming service subscriber and a range of MSISDN band of the partner network.

9. The call processing method according to claim 7, further comprising the steps of:
- when the mobile communication terminal is located in the partner network, a gateway location register acquiring a subscriber profile from a home location register in response to a location registration signal received from the mobile communication terminal, and transmitting the subscriber profile to a Serving GPRS Support Node (SGSN) of the partner network; and
- the gateway location register receiving an acknowledgement (ack) message from the SGSN of the partner network, wherein the roaming control unit updates the location information of the subscriber on a basis of the ack message received from the SGSN.

10. The call processing method according to claim 7, wherein when the mobile communication terminal originates a call using a number of some other network, a mobile switching center of the mobile communication terminal's own network sets a calling number as a number of the other network on a basis of a special prefix assigned to a called number.

11. A call processing method for mobile communication terminals using a primary number assigned by a home network and a secondary number assigned by a partner network, comprising the steps of:
when a call to the secondary number is received, determining whether a mobile communication subscriber having the secondary number has subscribed to international roaming service;
generating a text message indicating reception of the call to the secondary number if it is determined that the mobile communication subscriber has subscribed to the international roaming service; and
sending the generated text message to a terminal of the mobile communication subscriber,
wherein the determining whether the mobile communication subscriber has subscribed to the international roaming service is performed when a roaming control unit of the home network receives a Send Routing Information (SRI) signal for the secondary number from a gateway mobile switching center of the partner network.

12. The call processing method according to claim 11, further comprising the step of determining a location of the mobile communication subscriber terminal, and
wherein the text message is transmitted to the mobile communication subscriber terminal on a basis of the determined location of the mobile communication subscriber terminal.

13. The call processing method according to claim 11, wherein when the mobile communication subscriber terminal is located in the partner network or a third party network and a call to the primary number is received, a text message indicating reception of the call to the primary number is generated and is sent to the mobile communication subscriber terminal.

14. A call processing method for mobile communication terminals using a primary number assigned by a home network and a secondary number assigned by a partner network, comprising the steps of:
determining whether a mobile communication subscriber having the secondary number has subscribed to international roaming service when a call to the secondary number is received;
determining a location of a terminal of the mobile communication subscriber using a primary number corresponding to the secondary number if it is determined that the mobile communication subscriber has subscribed to the international roaming service; and
transferring reception of the call to the secondary number to the mobile communication subscriber terminal through a mobile switching center corresponding to the determined location,
wherein the step of determining whether the mobile communication subscriber has subscribed to the international roaming service is performed when a roaming control unit of the home network receives a Send Routing Information (SRI) signal for the secondary number from a gateway mobile switching center of the partner network.

15. The call processing method according to claim 14, wherein if it is determined that the mobile communication subscriber terminal has subscribed to the international roaming service, an Unstructured Supplementary Service Data (USSD) message, indicating that the call to the secondary number has been received, is sent to the mobile communication subscriber terminal.

16. The call processing method according to claim 14, wherein:
the determination about whether the mobile communication terminal has subscribed to the international roaming service is performed by a roaming control unit of the home network which receives a Send Routing Information (SRI) signal for the secondary number from a gateway mobile switching center of the partner network, and
the determination of the location of the mobile communication subscriber terminal is performed by a location register of the home network which receives a send routing information signal including the primary number.

17. The call processing method according to claim 16, further comprising the steps of:
determining whether the mobile communication subscriber terminal is located in the home network or a third party network if it is determined that the mobile communication subscriber has subscribed to the international roaming service;
the roaming control unit of the home network sending a signal, including previously agreed-upon data and the primary number, to the gateway mobile switching center of the partner network if it is determined that the mobile communication subscriber terminal is located in the home network or the third party network; and
a gateway mobile switching center of the home network receiving an Initial Address Message (IAM), including the primary number, from the gateway mobile switching center of the partner network, and transmitting a send routing information signal, including the primary number, to a location register of the home network.

18. The call processing method according to claim 17, further comprising the step of the roaming control unit of the home network sending the send routing information signal, including the primary number, to the location register of the home network if it is determined that the mobile communication subscriber is located in the partner network.

19. The call processing method according to claim 17, further comprising the step of the gateway mobile switching center of the partner network generating billing data (Call Data Records: CDR) of the mobile communication subscriber terminal between the partner network and the home network on a basis of the previously agreed-upon data.

20. The call processing method according to claim 17, further comprising the step of the gateway mobile switching center of the home network generating billing data (CDR) of the mobile communication subscriber terminal between the home network and the third party network if it is determined that the mobile communication subscriber terminal is located in the third party network.

21. The call processing method according to claim 17, wherein:
the signal and the IAM transmitted by the roaming control unit of the home network to the gateway mobile switching center of the partner network further comprise text information for reception of a call to the secondary number, and the mobile communication subscriber terminal displays the text information for the reception of the call to the secondary number on a screen at a time of receiving the call.

22. The call processing method according to claim 16, further comprising the steps of:
- determining whether the mobile communication subscriber terminal is located in the home network or the third party network if it is determined that the mobile communication subscriber has subscribed to the international roaming service;
- the roaming control unit of the home network transmitting information for changing processing of an intelligent network (Termination CAMEL Subscription Information: TCSI) to the gateway mobile switching center of the partner network and receiving an Initiate Detect Point (IDP) signal from the gateway mobile switching center of the partner network when the mobile communication subscriber terminal is located in the home network or the third party network;
- the roaming control unit of the home network transmitting a RequestReportBCSM (RRB)/CONNECT signal, including previously agreed-upon data and the primary number, to the gateway mobile switching center of the partner network; and
- the gateway mobile switching center of the home network receiving an Initial Address Message (IAM), including the primary number, from the gateway mobile switching center of the partner network, and transmitting a send routing information signal, including the primary number, to a location register of the home network.

23. The call processing method according to claim 22, further comprising the steps of:
- the roaming control unit of the home network receiving information about call connection and call termination of the mobile communication subscriber terminal from the gateway mobile switching center of the partner network; and
- the roaming control unit of the home network generating billing data of the mobile communication subscriber terminal between the partner network and the home network on a basis of the received call connection and call termination information.

24. The call processing method according to claim 17, wherein the step of determining whether the mobile communication subscriber terminal is located in the home network or the third party network is performed by the roaming control unit of the home network or a home location register of the home network.

25. The call processing method according to claim 22, wherein the step of determining whether the mobile communication subscriber terminal is located in the home network or the third party network is performed by the roaming control unit of the home network or a home location register of the home network.

* * * * *